(12) United States Patent
Sasaki et al.

(10) Patent No.: US 7,671,949 B2
(45) Date of Patent: Mar. 2, 2010

(54) POLARIZING PLATE WITH OPTICAL COMPENSATION FUNCTION, AND LIQUID CRYSTAL DISPLAY DEVICE USING THE SAME

(75) Inventors: Shinichi Sasaki, Ibaraki (JP); Takashi Yamaoka, Ibaraki (JP); Nao Murakami, Ibaraki (JP); Hiroyuki Yoshimi, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 10/500,287

(22) PCT Filed: Feb. 18, 2003

(86) PCT No.: PCT/JP03/01683

§ 371 (c)(1),
(2), (4) Date: Jun. 29, 2004

(87) PCT Pub. No.: WO03/071320

PCT Pub. Date: Aug. 28, 2003

(65) Prior Publication Data

US 2005/0078245 A1 Apr. 14, 2005

(30) Foreign Application Priority Data

Feb. 19, 2002 (JP) ............... 2002-041686

(51) Int. Cl.
*G02F 1/1335* (2006.01)
(52) U.S. Cl. ............... 349/119; 349/117; 349/118; 349/96
(58) Field of Classification Search ........... 349/117, 349/119
See application file for complete search history.

(56) References Cited

U.S. PATENT DOCUMENTS

| | | | |
|---|---|---|---|
| 5,132,147 A | 7/1992 | Takiguchi et al. | 427/393.5 |
| 5,193,020 A | 3/1993 | Shiozaki et al. | 359/73 |
| 5,548,422 A * | 8/1996 | Conner et al. | 349/98 |
| 6,342,934 B1 * | 1/2002 | Kameyama et al. | 349/98 |
| 6,380,996 B1 | 4/2002 | Yokoyama et al. | 349/117 |
| 6,400,433 B1 * | 6/2002 | Arakawa et al. | 349/117 |
| 6,444,280 B1 * | 9/2002 | Matsuoka et al. | 428/1.3 |
| 6,519,017 B1 * | 2/2003 | Ichihashi et al. | 349/117 |
| 6,580,483 B2 * | 6/2003 | Suzuki et al. | 349/115 |
| 6,657,690 B2 * | 12/2003 | Hashimoto | 349/117 |

(Continued)

FOREIGN PATENT DOCUMENTS

DE 43 42 280 6/1995

(Continued)

OTHER PUBLICATIONS

Office Action of Corresponding Japanese Patent Application No. 2003-038758 mailed Aug. 29, 2006.

(Continued)

*Primary Examiner*—David Nelms
*Assistant Examiner*—W. Patty Chen
(74) *Attorney, Agent, or Firm*—Westerman, Hattori, Daniels & Adrian, LLP

(57) ABSTRACT

A polarizing plate with optical compensation function, including a polarizing layer and an optically compensating layer, wherein the optically compensating layer includes an optically compensating A-layer including a stretched polymer film and an optically compensating B-layer including a cholesteric liquid crystal layer.

6 Claims, 8 Drawing Sheets

U.S. PATENT DOCUMENTS

| | | | |
|---|---|---|---|
| 6,685,998 B1 * | 2/2004 | Nishikawa et al. | 428/1.3 |
| 6,771,340 B1 | 8/2004 | Yoshimi et al. | 349/118 |
| 6,773,766 B2 * | 8/2004 | Meyer et al. | 428/1.1 |
| 6,829,026 B2 * | 12/2004 | Sasaki et al. | 349/118 |
| 6,867,834 B1 * | 3/2005 | Coates et al. | 349/119 |
| 6,888,598 B2 * | 5/2005 | Kim et al. | 349/117 |
| 6,912,030 B1 * | 6/2005 | Coates et al. | 349/119 |
| 2003/0219548 A1 | 11/2003 | Meyer et al. | |

FOREIGN PATENT DOCUMENTS

| | | |
|---|---|---|
| DE | 195 20 660 | 12/1996 |
| DE | 195 20 704 | 12/1996 |
| EP | 1 156 349 | 11/2001 |
| EP | 1 160 591 | 12/2001 |
| JP | 3-9325 | 1/1991 |
| JP | 2660601 B | 6/1997 |
| JP | 10-142423 A | 5/1998 |
| JP | 2000-304932 | 11/2000 |
| JP | 2001-42127 | 2/2001 |
| JP | 2001-100036 | 4/2001 |
| JP | 2001-215329 A | 8/2001 |
| JP | 2001-242320 A | 9/2001 |
| JP | 2001-343529 | 12/2001 |
| JP | 2002-6138 | 1/2002 |
| WO | WO 00/37585 A1 | 6/2000 |
| WO | WO 00/39631 A1 | 7/2000 |

OTHER PUBLICATIONS

J. Chen et al., "Optimum Film Compensation Modes for TN and VA LCDs", *SID 98 Digest*, Society for Information, May 17, 1998, pp. 315-318.

Office Action of Corresponding Japanese Patent Application No. 2003-038785 mailed Feb. 6, 2007.

* cited by examiner

POLARIZING PLATE WITH OPTICAL COMPENSATION FUNCTION, AND LIQUID CRYSTAL DISPLAY DEVICE USING THE SAME

TECHNICAL FIELD

The present invention relates to a polarizing plate with optical compensation function, and a liquid crystal display using the same.

BACKGROUND ART

An optically compensating layer with controlled principal refraction indices (nx, ny, nz) in two directions within a plane and in a thickness direction is required for obtaining a liquid crystal display that compensates birefringence of a liquid crystal cell and provides an excellent omnidirectional display. It should be noted particularly that a VA (vertically aligned) type or an OCB (optically compensated bend) type liquid crystal display requires an optically compensating layer providing principal refraction indices in three directions of nx>ny>nz.

An optically compensating layer conventionally used is prepared by laminating two or more stretched polymer films. Such an optically compensating layer is formed, for example, by preparing two polymer films that are stretched uniaxally, and laminating the films so that the directions of the respective in-plane retardation axes within the layer cross at right angles.

However, since a stretched polymer film has a thickness of about 1 mm, an optically compensating layer formed by laminating two or more stretched polymer films will become thick, thus increasing the whole thickness of the liquid crystal display.

An object of the present invention is to provide a polarizing plate with optical compensation function, formed by laminating an optically compensating layer that is thinner than an optically compensating layer formed by laminating two or more stretched polymer films.

DISCLOSURE OF INVENTION

The present invention provides a polarizing plate with optical compensation function, and the polarizing plate includes a polarizing layer and an optically compensating layer. The optically compensating layer includes an optically compensating A-layer including a stretched polymer film, and an optically compensating B-layer including a cholesteric liquid crystal layer.

The present invention further provides a liquid crystal display including a liquid crystal cell and a polarizing plate with optical compensation function according to the present invention, wherein the polarizing plate is arranged on at least one surface of the liquid crystal cell.

PREFERRED MODE FOR CARRYING OUT THE INVENTION

Figure 1:
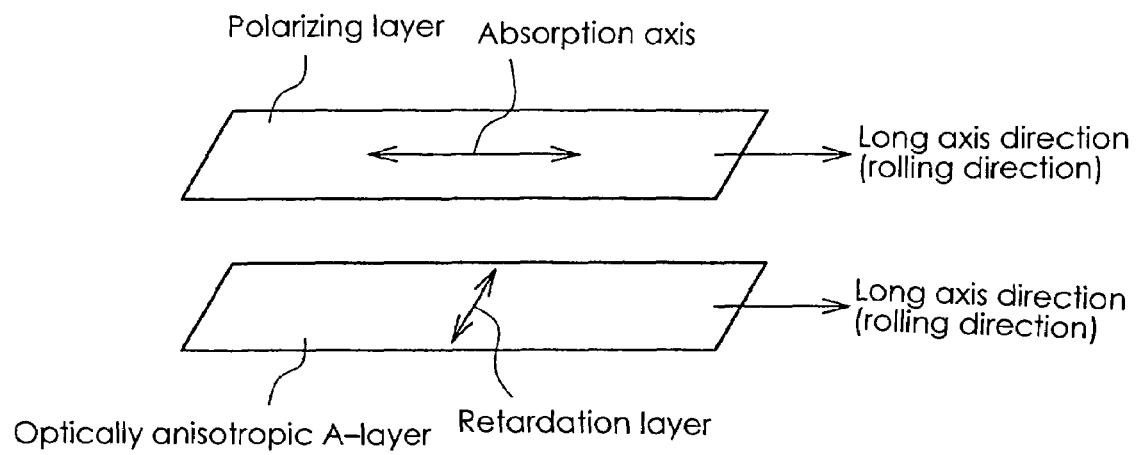
FIG. 1 is a schematic cross-sectional view showing an example of a polarizing plate with optical compensation function according to the present invention.

A typical cholesteric liquid crystal layer has a thickness of 50 μm or less, for example, 10 μm. Therefore, a thickness of a laminate of an optically compensating A-layer including a stretched polymer film and an optically compensating B-layer including a cholesteric liquid crystal layer can be decreased in comparison with a laminate of two layers of stretched polymer films (in general, about 1 mm per layer). Furthermore, even when two or more optically compensating B-layers are laminated for improving the optical compensation function, the laminate will be thinner than a laminate of two stretched polymer films, since each optically compensating B-layer has a decreased thickness.

The polarizing plate with optical compensation function according to the present invention includes an optically compensating A-layer and an optically compensating B-layer, and the order for lamination can be decided arbitrarily. The order can be, for example: a polarizing layer, an optically compensating A-layer and an optically compensating B-layer; or, a polarizing layer, an optically compensating B-layer and an optically compensating A-layer. Furthermore, two or more optically compensating A-/B-layers can be included in an arbitrary order. For example, the order can be: a polarizing layer, an optically compensating B-layer, an optically compensating A-layer and an optically compensating B-layer.

It is preferable that the polarizing layer and the optically compensating A-layer are arranged so that an angle formed by an absorption aids of the polarizing layer and a slow axis of the optically compensating A-layer will be not smaller than 85° and not larger than 95°. When a polarizing plate with optical compensation function, having the layers arranged to form the angle, is used for a liquid crystal cell such as a VA type or an OCB type, birefringence of the cells will be compensated efficiently, thereby enlarging the viewing angle of a liquid crystal display including the polarizing plate with optical compensation function. More preferably, the angle formed by the absorption axis direction of the polarizing layer and the slow axis direction of the optically compensating A-layer is from 86° to 94°, further preferably, from 87° to 93°.

In the present invention, the polymer film included in the optically compensating A-layer is made of a liquid crystal film or a stretched polymer film prepared by stretching an unstretched polymer film in an appropriate manner. It is most preferable that the liquid crystal film is made of a nematic liquid crystal.

Though there is no particular limitation, the unstretched polymer film can be made of a material that can provide an optical anisotropy by stretching the film and that has excellent birefringence controllability, transparency, and thermal resistance. The unstretched polymer film can be used alone, or two or more kinds of films can be used in combination. The examples include polyolefins (e.g., polyethylene and polypropylene), polynorbornen-based polymer, polyester, polyvinyl chloride, polystyrene, polyacrylonitrile, polysulfone, polyarylate, polyvinyl alcohol, polymethacrylate, polyacrylic ester, cellulose ester, and copolymers thereof.

A polymer film described in JP 2001-343529A (WO01/37007) can be also included in the examples. An example of the polymer material is a resin composition containing a thermoplastic resin whose side chain has a substituted or unsubstituted imide group and a thermoplastic resin whose side chain has a substituted or unsubstituted phenyl group and a cyano group. The example is a resin composition having an alternating copolymer including isobutene and N-methylene maleimide and a styrene-acrylonitrile copolymer.

A method for manufacturing the unstretched polymer film is not particularly limited, but any ordinary methods can be applied. Extrusion or flow-expansion is preferred since irregularity of birefringence in a stretched polymer film can be suppressed. The unstretched polymer film has a thickness of, for example, not more than 3 mm, preferably, in a range of 1 μm to 1 mm, and particularly preferably, in a range of 5 μm to 500 μm.

The method of stretching the unstretched polymer film is not particularly limited, but ordinary methods can be applied. The examples include tenter transverse stretching and biaxial stretching. It is preferable in the biaxial stretching that the stretch ratio in the long axis direction is lower than that in the short axis direction. The biaxial stretching can be selected from simultaneous biaxial stretching that uses tenters alone, and a sequential biaxial stretching that uses rolls and tenters.

Though the stretch ratio of the unstretched polymer film varies depending on the stretching method, it is in general from 101 to 250% with respect to the length of the unstretched polymer film. Preferably, the stretch ratio of the unstretched polymer film is from 101 to 200% with respect to the length thereof. The temperature for stretching the unstretched polymer film is selected suitably corresponding to the glass transition point (Tg) of the unstretched polymer film in use, the kinds of additives in the unstretched polymer film, or the like. The temperature for stretching the unstretched polymer film is, for example, 80° C. to 250° C., preferably, 120° C. to 220° C., and particularly preferably, 140° C. to 200° C. Especially, the temperature for stretching the unstretched polymer film is substantially equal or higher than Tg of the unstretched polymer film to be stretched.

The thickness of the stretched polymer film can be determined suitably corresponding to the size of an image display screen to which the film will be applied. The thickness of the stretched polymer film is, for example, 1 mm or less, preferably, in a range of 1-500 μm, and particularly preferably in a range of 5-300 μm.

It is preferable that the optically compensating A-layer including the stretched polymer film satisfy the following formulae (I) and (II).

$$20 \text{ (nm)} \leq Re \leq 300 \text{ (nm)} \quad (I)$$

$$1.2 < Rth/Re \quad (II)$$

In the above formulae,

Re (retardation value in normal direction)=(nx−ny)·d

Rth (retardation value in thickness direction)=(nx−nz)·d.

Furthermore, in the above formulae, nx, ny and nz respectively denote refractive indices of X axis, Y axis and Z axis in the optically compensating A-layer. The X axis denotes an axial direction presenting a maximum refractive index within the optically compensating A-layer, the Y axis denotes an axial direction perpendicular to the X axis within the layer, and the Z axis denotes a thickness direction perpendicular to the X axis and the Y axis. In the equations, 'd' denotes the thickness of the optically compensating A-layer.

It is preferable in the formula (I) that $25 \leq Re \leq 250$, and more preferably, $30 \leq Re \leq 200$. It is also preferable that $1.5 \leq Rth/Re$, and more preferably, $2 \leq Rth/Re$.

An optically compensating B-layer can be manufactured by coating a cholesteric liquid crystal on an alignment layer, aligning the liquid crystal and fixing the alignment state so as to form a cholesteric liquid crystal layer.

The cholesteric liquid crystal layer is not particularly limited, but any cholesteric liquid crystal layer manufactured by a method corresponding to a conventional process of liquid crystal alignment can be used. First, for example, a cholesteric liquid crystal polymer and a chiral dopant are coated on an alignment layer of a base. The coated layer is heated to a temperature not lower than a glass transition temperature but lower than an isotropic phase transition temperature, thereby aligning liquid crystal polymer molecules in the coated layer. Later, the coated layer is cooled to a temperature lower than the glass transition temperature, thereby forming on the base a cholesteric liquid crystal layer in which alignment of the liquid crystal polymer molecules is fixed. In an alternative method, a photo-crosslinkable liquid crystal monomer and a chiral dopant are coated on the alignment layer, heated at a temperature not lower than a glass transition temperature but lower than an isotropic phase transition temperature as mentioned above, thereby aligning the liquid crystal monomer in the coated layer. This is subjected to a light treatment to crosslink the liquid crystal monomer, thereby forming a cholesteric liquid crystal layer on the base.

For controlling the selective reflection wavelength range within the above-mentioned range, the cholesteric liquid crystal layer is preferred to contain a chiral dopant. In the present invention, the chiral dopant is, for example, a compound functioning to align the below-stated liquid crystal monomer and liquid crystal polymer to have a cholesteric structure.

The chiral dopant is not particularly limited in kind as long as it can align constituent molecules of the cholesteric layer to have a cholesteric structure as described above, but the chiral dopants that will be described later are preferable, for example.

In these chiral dopants, the helical twisting power thereof preferably is at least $1 \times 10^{-6}$ nm$^{-1}$·(wt %)$^{-1}$, more preferably is at least $1 \times 10^{-5}$ nm$^{1}$·(wt %)$^{-1}$, further preferably ranges from $1 \times 10^{-5}$ to $1 \times 10^{-2}$ nm$^{-1}$·(wt %)$^{-1}$, particularly preferably ranges from $1 \times 10^{-4}$ to $1 \times 10^{-3}$ nm$^{-1}$·(wt %)$^{-1}$. By using the chiral dopant with the above helical twisting power, for example, the helical pitch of the formed cholesteric layer can be controlled to the range described below, making it duly possible to control the selective reflection wavelength range to the above-noted range.

In general, the helical twisting power refers to an ability to give a twist to liquid crystal materials such as a liquid crystal monomer and a liquid crystal polymer, which will be described later, thus aligning those materials in a helical manner and is expressed by the equation below.

Helical twisting power=1/[Cholesteric pitch (nm)× Weight ratio of chiral dopant (wt %)]

In the above equation, the weight ratio of chiral dopant refers to the ratio (weight ratio) of the chiral dopant in a mixture containing, for example, a liquid crystal monomer or a liquid crystal polymer and the chiral dopant and is expressed by the equation below.

Weight ratio of chiral dopant (wt %)=[X/(X+Y)]×100

X: Weight of chiral dopant
Y: Weight of liquid crystal monomer or liquid crystal polymer First, an example of manufacturing methods using a cholesteric liquid crystal polymer will be described below.

For the cholesteric liquid crystal polymer, conventionally known polymers can be used suitably. Examples of the cholesteric liquid crystal polymers are based on, for example, cyanobiphenyl, cyanophenylcyclohexane, cyanophenyl ester, benzoic acid phenyl ester, phenylpyrimidine and a mixture thereof. It is also preferable to adjust the ratio of the cholesteric liquid crystal polymer to the chiral dopant, and especially, to adjust the selective reflection wavelength range to be 350 nm or less. For the cholesteric liquid crystal polymer of the present invention, a polymer described in JP 2660601 (Nippon Oil Corporation) also can be used preferably.

First, the cholesteric liquid crystal polymer is coated on an alignment layer. The coating method is not particularly limited, but conventionally known methods can be applied. The examples include coating a solution of the cholesteric liquid crystal polymer, and coating a melt of the cholesteric liquid crystal polymer. A particularly preferred method is coating a solution of the cholesteric liquid crystal polymer.

Though there is no particular limitation on a polymer concentration in the cholesteric liquid crystal polymer solution, the concentration of the cholesteric liquid crystal polymer is, for example, 5-50 wt %, preferably, 7-40 wt %, and more preferably, 10-30 wt % with respect to a solvent.

The chiral dopant is not particularly limited as long as it can align the liquid crystal polymer of the cholesteric layer to have a cholesteric structure as mentioned above, but chiral dopants that will be described below are preferred, for example. These chiral dopants may be used alone, or in combination of two or more.

The ratio of the chiral dopant to be added is determined suitably according to a desired selective reflection wavelength range, for example. The addition ratio with respect to the liquid crystal polymer ranges from 5 wt % to 23 wt % and preferably ranges from 10 wt % to 20 wt %. As described above, by controlling the addition ratio of the chiral dopant to the liquid crystal polymer in this manner, the selective wavelength range of an optically compensating Blayer to be formed can be set to the above-mentioned range. When the ratio of the chiral dopant to the liquid crystal polymer is smaller than 5 wt %, it becomes difficult to control the selective reflection wavelength range of an optically compensating B-layer to be formed to a shorter wavelength side. On the other hand, when this ratio is larger than 23 wt %, the temperature range in which the liquid crystal polymer is aligned in a cholesteric manner, that is, the temperature range in which the liquid crystal polymer is in a liquid crystalline phase becomes narrow, so that the temperature in an aligning process, which will be described later, has to be controlled precisely, making the manufacturing difficult.

The solvent for the cholesteric liquid crystal polymer solution is not particularly limited as long as, for example, it can dissolve the cholesteric liquid crystal polymer. It can be determined suitably depending on the kind of the cholesteric liquid crystal polymer. Specific examples thereof include, for example, halogenated hydrocarbons such as chloroform, dichloromethane, carbon tetrachloride, dichloroethane, tetrachloroethane, trichloroethylene, tetrachloroethylene, chlorobenzene and orthodichlorobenzene; phenols such as phenol and parachlorophenol; aromatic hydrocarbons such as benzene, toluene, xylene, methoxybenzene and 1,2-dimethoxybenzene; ketone-based solvents such as acetone, methyl ethyl ketone, methyl isobutyl ketone, cyclohexanone, cyclopentanone, 2-pyrrolidone and N-methyl-2-pyrrolidone; ester-based solvents such as ethyl acetate and butyl acetate; alcohol-based solvents such as t-butyl alcohol, glycerin, ethylene glycol triethylene glycol, ethylene glycol monomethyl ether, diethylene glycol dimethyl ether, propylene glycol dipropylene glycol and 2-methyl-2,4-pentanediol; amide-based solvents such as dimethylformamide and dimethylacetamide; nitrile-based solvents such as acetonitrile and butyronitrile; ether-based solvents such as diethyl ether, dibutyl ether and tetrahydrofuran; or carbon disulfide, ethyl cellosolve or butyl cellosolve. These solvents may be used alone or as a mixture of two or more.

In the cholesteric liquid crystal polymer material solution, various known additives such as a stabilizer, a plasticizer, metals and the like further may be blended as necessary.

The cholesteric liquid crystal polymer solution may contain other different resins as long as the aligning property or the like of the cholesteric liquid crystal polymer does not drop considerably. Such resins can be, for example, resins for general purpose use, engineering plastics, thermoplastic resins and thermosetting resins.

The resins for general purpose use can be, for example, polyethylene (PE), polypropylene (PP), polystyrene (PS), polymethyl methacrylate (PMMA), an ABS resin, an AS resin or the like. The engineering plastics can be, for example, polyacetate (POM), polycarbonate (PC), polyamide (PA: nylon), polyethylene terephthalate (PET), polybutylene terephthalate (PBT) or the like. The thermoplastic resins can be, for example, polyphenylene sulfide (PPS), polyethersulfone (PES), polyketone (PK), polyimide (PI), polycyclohexanedimethanol terephthalate (PCT), polyarylate (PAR), liquid crystal polymers (LCP) or the like. The thermosetting resins can be, for example, epoxy resins, phenolic novolac resins or the like.

When the above-described other resins are blended in the polymer solution lo as mentioned above, the blend amount ranges, for example, 0-50 wt %, preferably, 0-30 wt %, with respect to the cholesteric liquid crystal polymer.

Next, the cholesteric liquid crystal polymer solution is applied onto the alignment layer so as to form an expanded layer.

The coating of the cholesteric liquid crystal polymer solution can be carried out by a suitable method such as spin coating, roller coating, flow coating, printing, dip coating, film flow-expanding, bar coating or gravure printing. In the coating, polymer layers can be superimposed as required.

The alignment layer is not particularly limited as long as it can align the cholesteric liquid crystal polymer. For example, plastic films or plastic sheets whose surfaces are rubbed with a rayon cloth or the like can be used. Alternatively, the alignment layer can be obtained by providing the above-mentioned plastic film or sheet on the surface of a base such as a substrate made of a metal like aluminum, copper or steel, a ceramic substrate or a glass substrate, or by forming an obliquely deposited film of an inorganic compound such as $SiO_2$ on that surface. Alternative examples include forming on the surface a layer having a microgroove, or forming an alignment layer by accumulating an organic compound (such as ω-tricosane acid, dioctadecyl methylammonium chlorite, and methyl stearate) by a Langmuir-Blodgett (LB) technique. Furthermore, the alignment layer can be prepared by applying an electric/magnetic field to a stretched polymer film, a plastic film/sheet as described in JP H03-9325 A (JP 2631015), or by arranging an alignment layer that will have an aligning function by means of light irradiation.

The alignment layer is not particularly limited as long as it has a function to align the cholesteric liquid crystal polymer. A surface of a protective layer of a polarizing layer can be rubbed to serve as a protective layer and also as an alignment layer.

Subsequently, the expanded layer of the cholesteric liquid crystal polymer is subjected to a heat treatment, thereby aligning the cholesteric liquid crystal polymer. The temperature condition for the heat treatment can be determined suitably depending on the kind of the cholesteric liquid crystal polymer, more specifically, a temperature at which the cholesteric liquid crystal polymer shows a liquid crystal property. It should be set to be not lower than a glass transition point of the cholesteric liquid crystal polymer and not higher than an isotropic point. The method of using the cholesteric liquid crystal polymer is further preferred in light of the workability, since a crosslinking treatment after aligning the liquid crystal molecules is not required.

Moreover, as mentioned above, it is preferable that the cholesteric liquid crystal layer contains a polymer formed by polymerizing or crosslinking a photo-crosslinkable liquid crystal monomer. With this structure, as described later, because of its liquid crystal property, the monomer can be aligned while having a cholesteric structure, and this alignment can be fixed by, for example, polymerizing the monomers. When using the liquid crystal monomer, the polymer that is polymerized by the above fixing comes to have a non-liquid crystal property. Thus, the formed cholesteric liquid crystal layer has a cholesteric structure as in a cholesteric liquid crystalline phase, but is not constituted by liquid crystal molecules. Therefore, there occurs no transformation peculiar to the liquid crystal molecules, i.e., transformation to a liquid crystalline phase, a glassy phase or a crystal phase due to temperature change. Consequently, an extremely stable cholesteric liquid crystal layer whose cholesteric structure is not affected by temperature change can be achieved, which is particularly useful as a retardation film for optical compensation, for example.

A cholesteric liquid crystal layer can be formed in the same manner as the case using the cholesteric liquid crystal polymer unless there is no specific explanation.

It is preferable that the liquid crystal monomer be represented by the chemical formula (1) below. Although such liquid crystal monomers generally are nematic liquid crystal monomers, the liquid crystal monomer of the present invention is given a twist by the chiral dopant and eventually achieves a cholesteric structure. Also, since the monomer needs to be polymerized or crosslinked for fixing the alignment in the cholesteric layer, it is preferable that the monomer contain at least one of a polymerizable monomer and a crosslinkable monomer.

It is preferable that the cholesteric layer further contain at least one of a polymerizing agent and a crosslinking agent. For example, an ultraviolet curing agent, a photocuring agent or a thermosetting agent can be used.

The ratio of the liquid crystal monomer in the cholesteric liquid crystal layer preferably ranges from 75 wt % to 95 wt %, and more preferably, ranges from 80 wt % to 90 wt %. Also, the ratio of a chiral dopant to the liquid crystal monomer preferably ranges from 5 wt % to 23 wt %, and more preferably, ranges from 10 wt % to 20 wt %. Further, the ratio of the crosslinking agent or the polymerizing agent to the liquid crystal monomer preferably ranges from 0.1 wt % to 10 wt %, more preferably, ranges from 0.5 wt % to 8 wt %, and particularly preferably, ranges from 1 wt % to 5 wt %.

The optically compensating B-layer of the present invention may be formed of, for example, the cholesteric liquid crystal layer alone as described above, but further can include a substrate and be a laminate of the substrate and the cholesteric liquid crystal layer formed on the substrate.

Next, a method for manufacturing an optically compensating B-layer of the present invention includes: forming an expanded layer by expanding, onto an alignment layer, a coating solution that contains a liquid crystal monomer, a chiral dopant and at least one of a polymerizing agent and a crosslinking agent and has a ratio of the chiral dopant to the liquid crystal monomer ranging from 5 wt % to 23 wt %; subjecting the expanded layer to a heat treatment so that the liquid crystal monomer is aligned while having a cholesteric structure; and subjecting the expanded layer to at least one of a polymerization treatment and a crosslinking treatment so as to fix the alignment of the liquid crystal monomer and form a cholesteric liquid crystal layer of a non-liquid crystal polymer. Such a manufacturing method makes it possible to manufacture an optically compensating B-layer of the present invention having the above-described selective reflection wavelength range. By controlling the blend ratio of the liquid crystal monomer and the chiral dopant as described above, the selective reflection wavelength range can be controlled to a range not more than 350 nm.

The following is a specific example of a method for manufacturing an optically compensating B-layer of the present invention. First, a coating solution that contains the liquid crystal monomer, the chiral dopant and at least one of the crosslinking agent and the polymerizing agent is prepared.

As the liquid crystal monomer, a nematic liquid crystal monomer is preferable, for example. More specifically, a monomer represented by the formula (1) below can be used. The liquid crystal monomer may be one kind or a combination of two or more kinds.

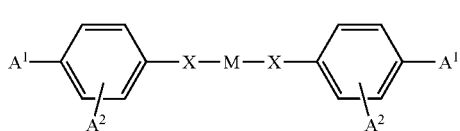

(1)

In the formula (1) above, $A^1$ and $A^2$ represent each a polymerizable group and may be identical or different, or one of $A^1$ and $A^2$ may be hydrogen. X represents each a single bond, —O—, —S—, —C=N—, —O—CO—, —CO—O—, —O—CO—O—, —CO—NR—, —NR—CO—, —NR—, —O—CO—NR—, —NR—CO—O—, —CH$_2$—O— or —NR—CO—NR, in which R represents H or $C_1$-$C_4$-alkyl and M represents a mesogenic group.

In the formula (1) above, Xs may be identical or different but preferably are identical.

In the monomer of the formula (1) above, $A^2$ preferably is ortho to $A^1$ at each occurrence.

Further, it is preferable that $A^1$ and $A^2$ mentioned above are each, independently of one another, represented by the formula below.

Z-X-(Sp)$_n$ (2)

It is preferable that $A^1$ and $A^2$ are identical.

In the formula (2) above, Z represents a crosslinkable group, X is similar to that of the formula (1) above, Sp represents a spacer formed of a straight-chain or branched chain alkyl group having 1 to 30 carbon atoms, and n is 0 or 1. The carbon chain in the Sp may be interrupted by oxygen in an ether functional group, suilir in a thioether functional group or nonadjacent imino or $C_1$-$C_4$-alkylimino groups, for example.

In the formula (2) above, it is preferable that Z is any of the radicals represented by the formulae below. In the formulae below, R is, for example, methyl, ethyl, n-propyl, i-propyl, n-butyl, i-butyl or t-butyl.

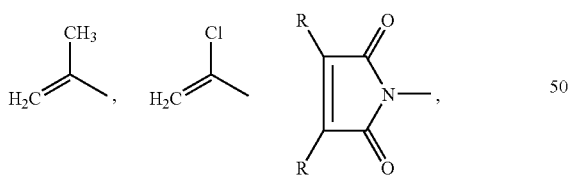

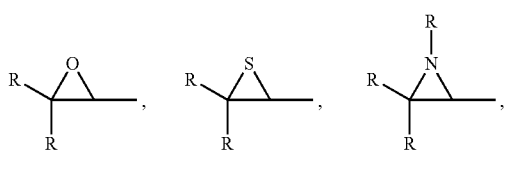

—N=C=O, —N=C=S, —O—C≡N,

Also, in the formula (2) above, it is preferable that Sp is any of the radicals represented by the formulae below. In the formulae below, it is preferable that m is 1 to 3 and p is 1 to 12.

—(CH$_2$)$_p$—, —(CH$_2$CH$_2$O)$_m$CH$_2$CH$_2$—,

—CH$_2$CH$_2$SCH$_2$CH$_2$—, —CH$_2$CH$_2$NHCH$_2$CH$_2$—,

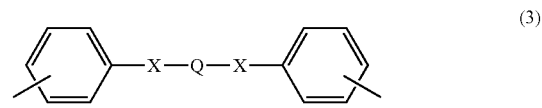

In the formula (1) above, it is preferable that M is represented by formula (3) below. In the formula (3) below, X is similar to X in the formula (1) above. Q represents, for example, substituted or unsubstituted alkylene or aromatic hydrocarbon radicals or may be a substituted or unsubstituted straight-chain or branched-chain $C_1$-$C_{12}$-alkylene or the like.

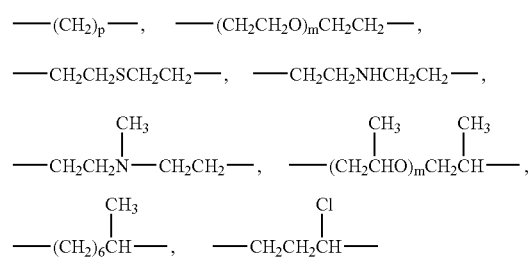

(3)

When Q is the aromatic hydrocarbon radicals, the radicals represented by the formulae below or substituted analogs thereof are preferable, for example.

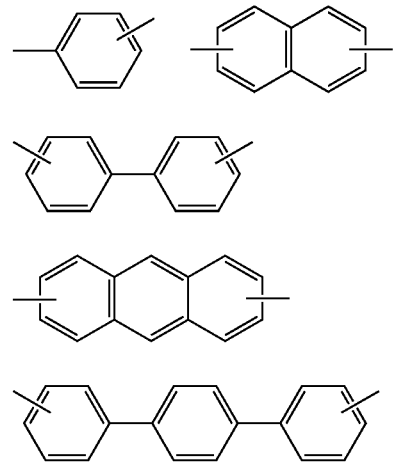

Substituted analogs of the aromatic hydrocarbon radicals represented by the formulae above may carry 1 to 4 substituents per aromatic ring, for example, or one or two substituents per aromatic ring or per group. The substituents may be identical or different. The substituents can be, for example, $C_1$-$C_4$-alkyl, nitro, halogen such as F, Cl, Br or I, phenyl or $C_1$-$C_4$-alkoxy.

Specific examples of the liquid crystal monomer can include monomers represented by the formulae (4) to (19) below.

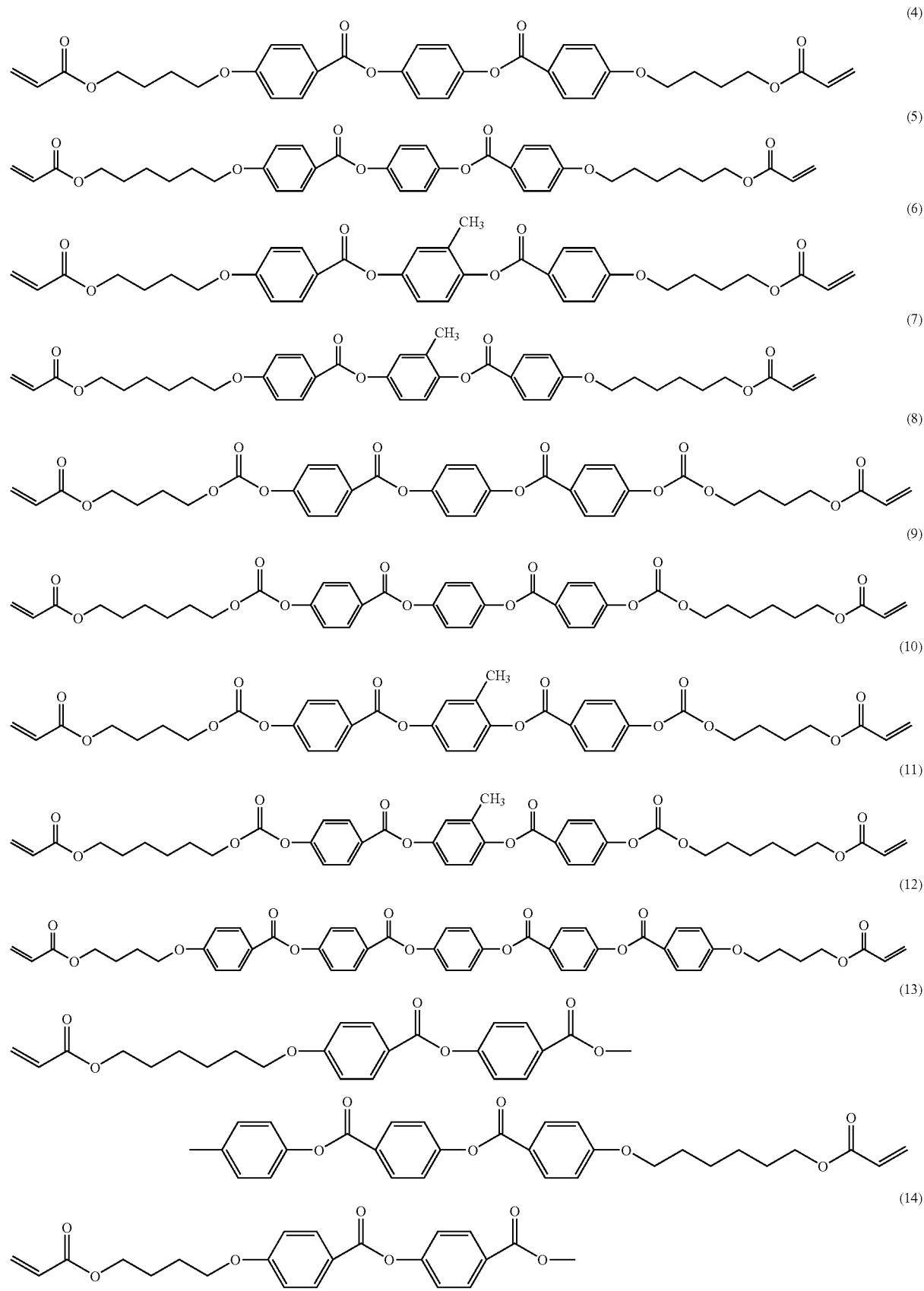

-continued

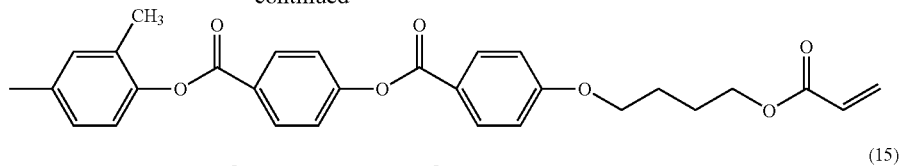

(15)

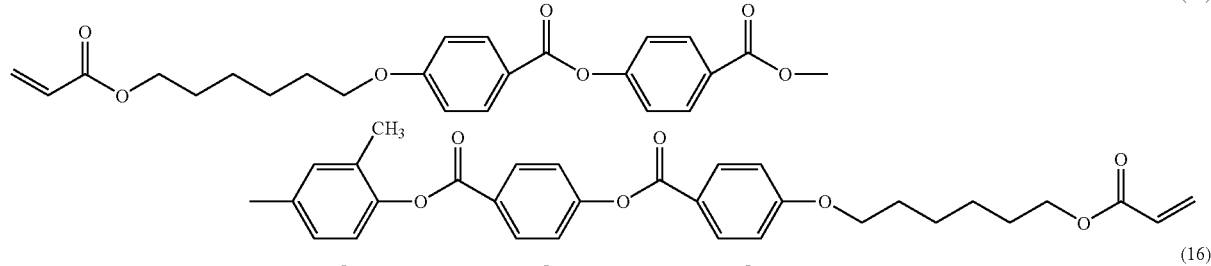

(16)

(17)

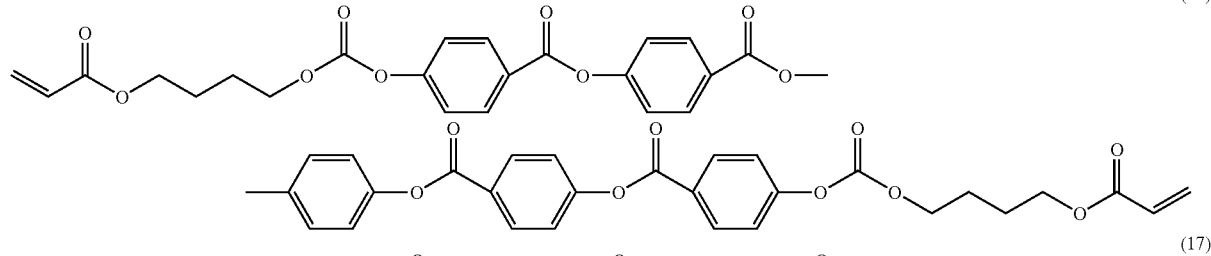

(18)

(19)

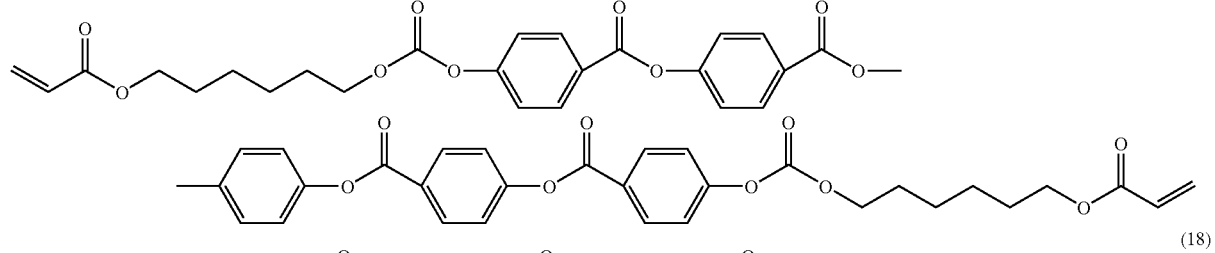

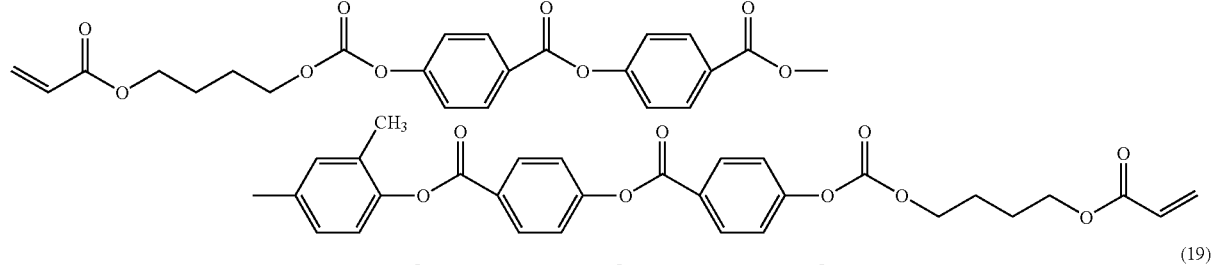

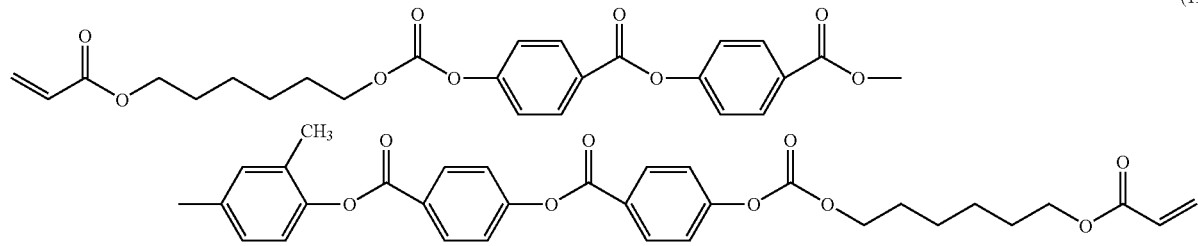

The temperature range in which the liquid crystal monomer shows a liquid crystal property varies depending on their kinds but preferably ranges from 40° C. to 120° C., for example, more preferably ranges from 50° C. to 100° C. and particularly preferably ranges from 60° C. to 90° C.

Although there is no particular limitation on the chiral dopant as long as it twists and aligns the liquid crystal monomer so as to have a cholesteric structure as described above, for example, a polymerizable chiral dopant is preferable. The abovedescribed chiral dopants can be used. These chiral dopants may be used alone or in combination of two or more.

More specifically, the polymerizable chiral dopant can be, for example, chiral compounds represented by the general formulae (20) to (23) below.

$(Z-X^5)_n Ch$ (20)

$(Z-X^2-Sp-X^5)_n Ch$ (21)

$(P^1-X^5)_n Ch$          (22)

$(Z-X^2-Sp-X^3-M-X^4)_n Ch$          (23)

In the above formulae, Z is similar to that in the formula (2) above, Sp is similar to that in the formula (2) above, $X^2$, $X^3$ and $X^4$ are each, independently of one another, a chemical single bond, —O—, —S—, —O—CO—, —CO—O—, —O—CO—O—, —CO—NR—, —NR—CO—, —O—CO—NR—, —NR—CO—O— or —NR—CO—NR—, and R represents H or $C_1$-$C_4$-alkyl. $X^5$ represents a chemical single bond —O—, —S— —O—CO—, —CO—O—, —O—CO—O—, —CO—NR—, —NR—CO—, —O—CO—NR—, —NR—CO—O—, —NR—CO—NR, —$CH_2$O—, —O—$CH_2$—, —CH=N—, —N=CH— or —N=N—. Similarly to the above, R represents H or $C_1$-$C_4$-alkyl. Similarly to the above, M represents a mesogenic group. $P^1$ represents hydrogen, a $C_1$-$C_{30}$-alkyl group, a $C_1$-$C_{30}$-acyl group or a $C_3$-$C_8$-cycloalkyl group substituted by 1 to 3 of $C_1$-$C_6$-alkyl, and n is an integer from 1 to 6. Ch represents an n-valent chiral group. In the formula (23) above, it is preferable that at least one of $X^3$ and $X^4$ be —O—CO—O—, —O—CO—NR—, —NR—CO—O— or —NR—CO—NR—. In the formula (22) above, when $P^1$ is an alkyl group, an acyl group or a cycloalkyl group, its carbon chain may be interrupted by oxygen in an ether functional group, sulfur in a thioether functional group or nonadjacent imino or $C_1$-$C_4$-alkylthio groups, for example.

Examples of the above-noted chiral group of Ch include radicals represented by the formulae below.

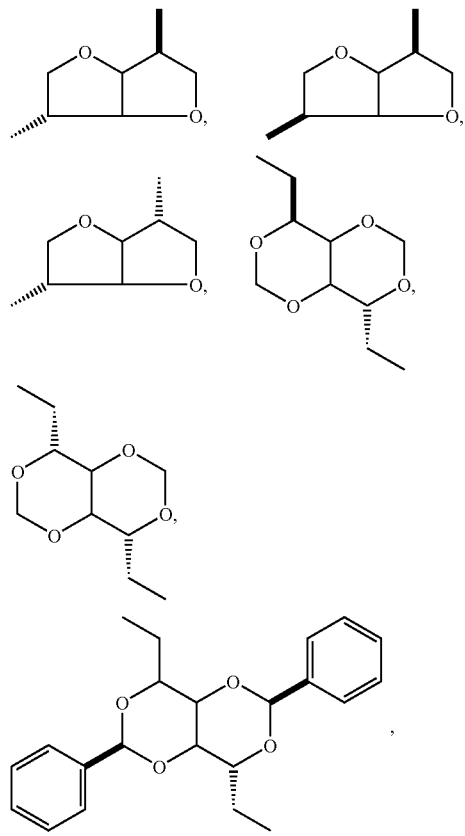

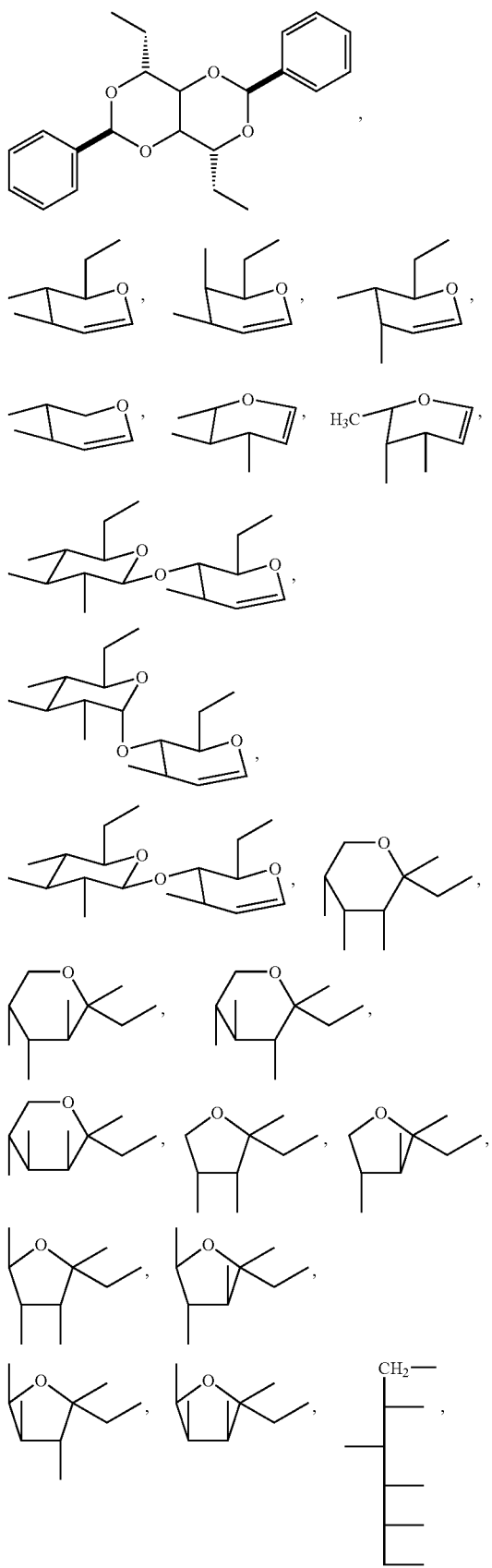

-continued

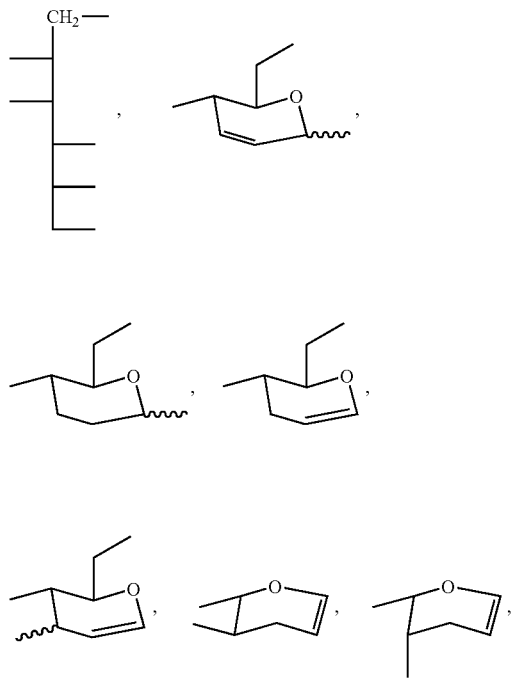

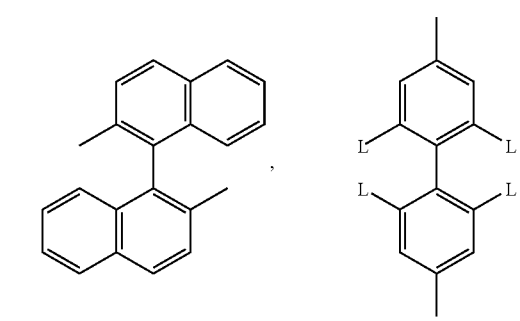

In the above radicals, L is $C_1$-$C_4$-alkyl, $C_1$-$C_4$-alkoxy, halogen, COOR, OCOR, CONR or NHCOR, and R represents $C_1$-$C_4$-alkyl. Terminal ends in the radicals represented by the formulae above indicate dangling bonds with the adjacent groups.

Among the above radicals, radicals represented by the formulae below are particularly preferable.

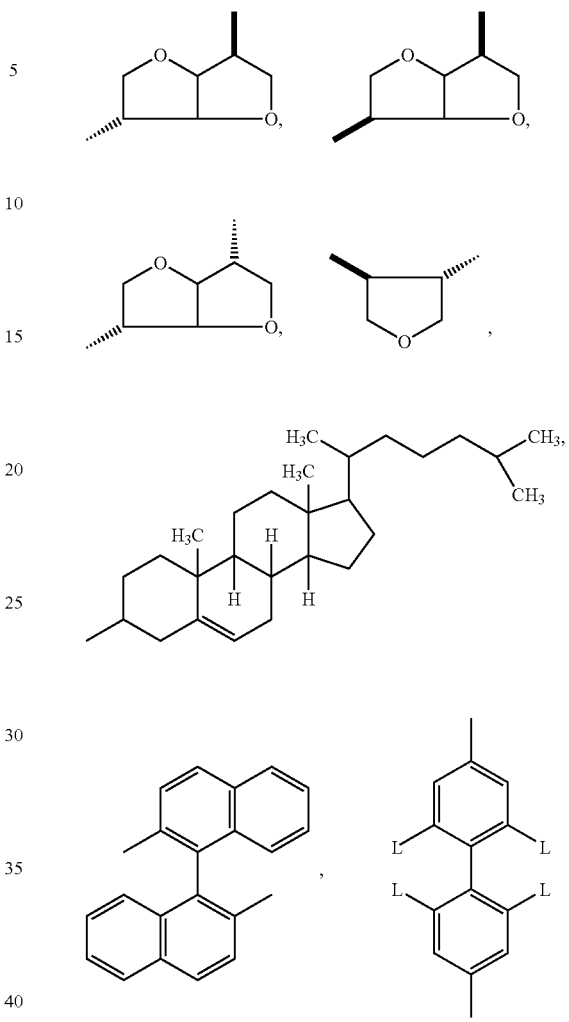

It is preferable that the chiral compound represented by the formula (21) or (23) above is, for example, a radical in which n is 2, Z represents $H_2C\!=\!CH\!-\!$ and Ch is represented by any of the formulae below.

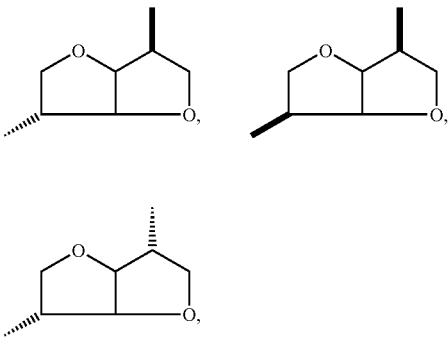

Specific examples of the chiral compound can include compounds represented by the formulae (24) to (44) below. Incidentally, these chiral compounds have a helical twisting power of at least $1\times10^{-6}$ $nm^{-1}\cdot(wt\,\%)^{-1}$.

(24)
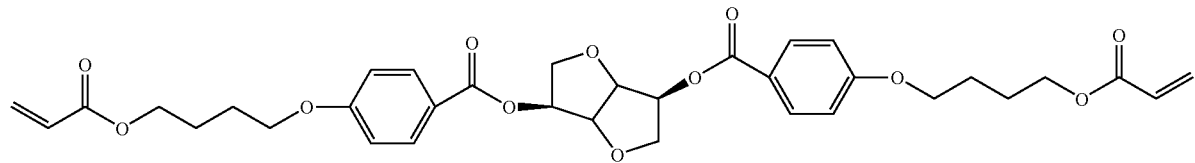
(25)
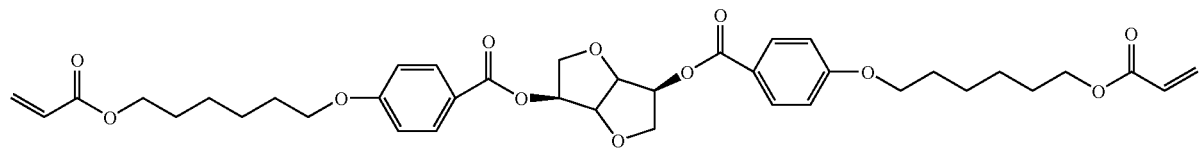
(26)
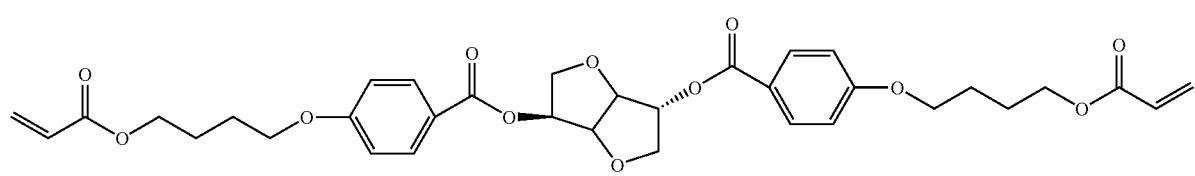
(27)
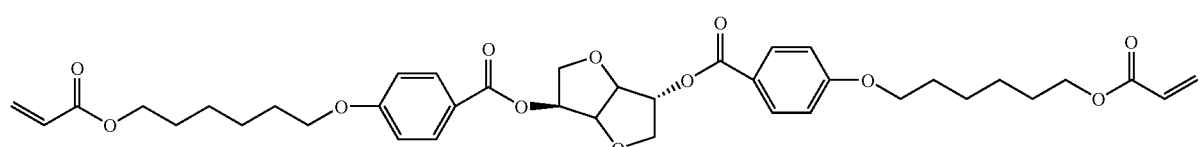
(28)
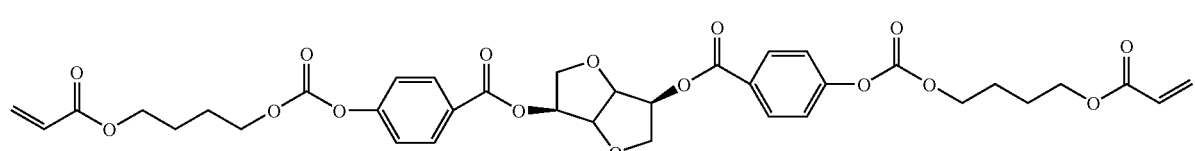
(29)
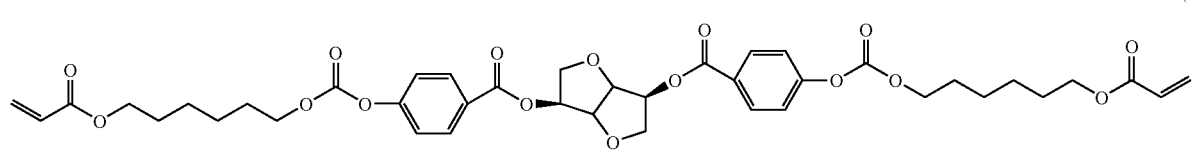
(30)
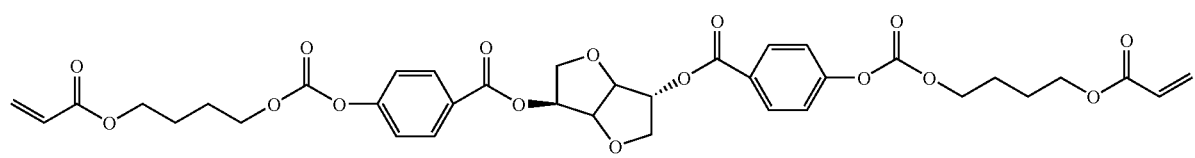
(31)
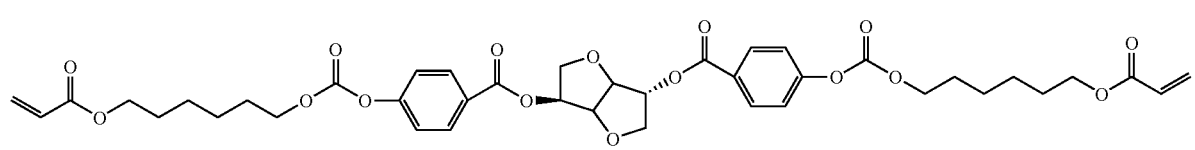
(32)
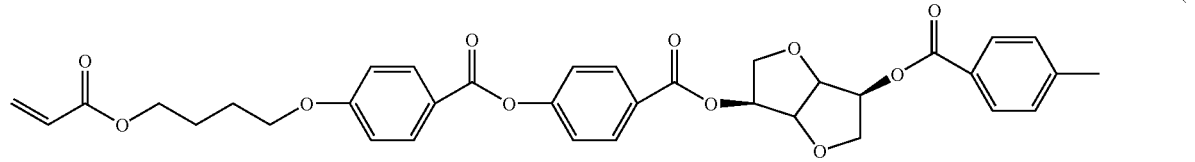

-continued
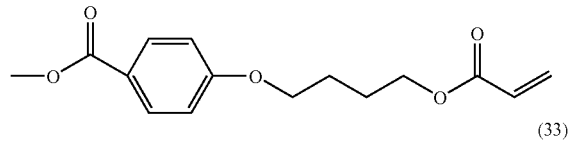
(33)
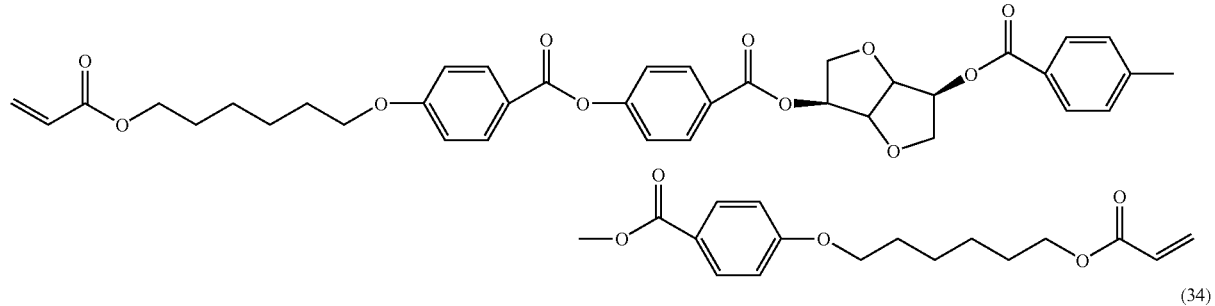
(34)
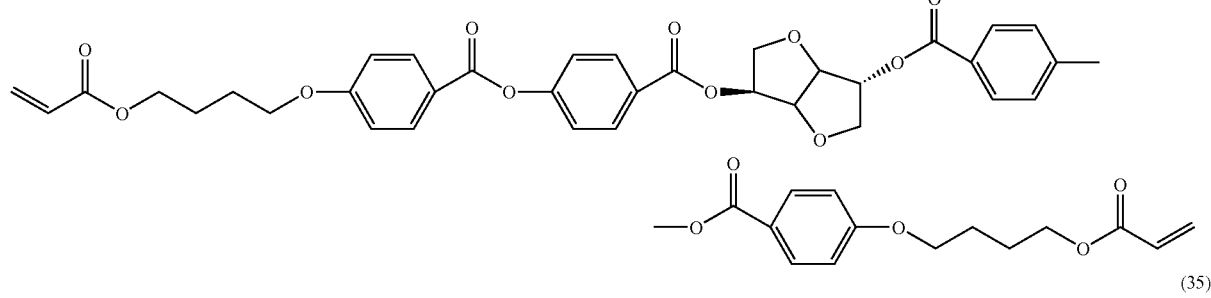
(35)
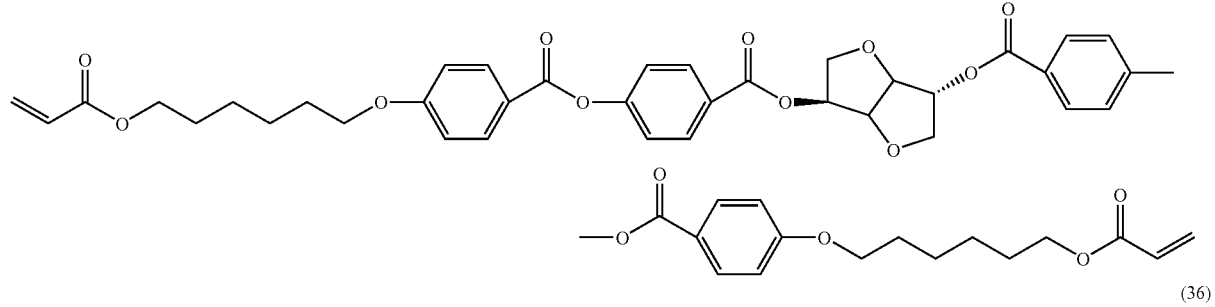
(36)
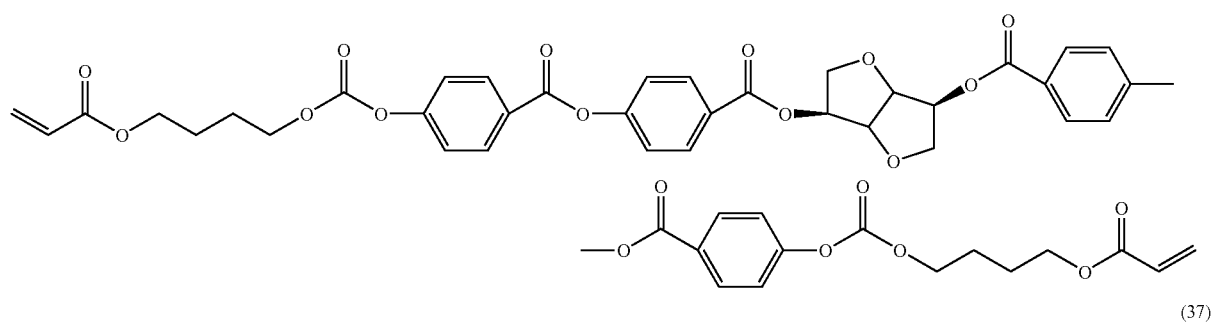
(37)
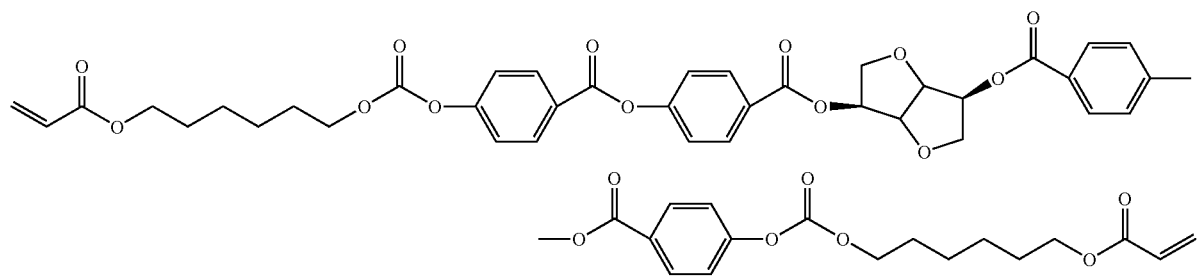

-continued
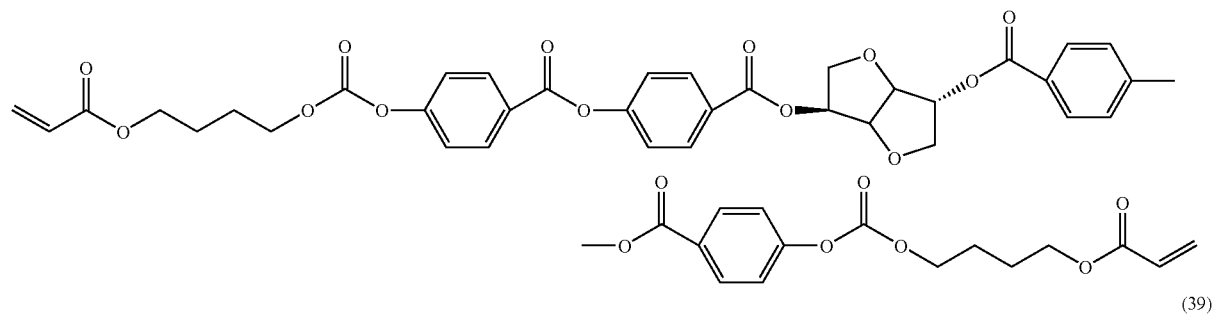
(38)
(39)
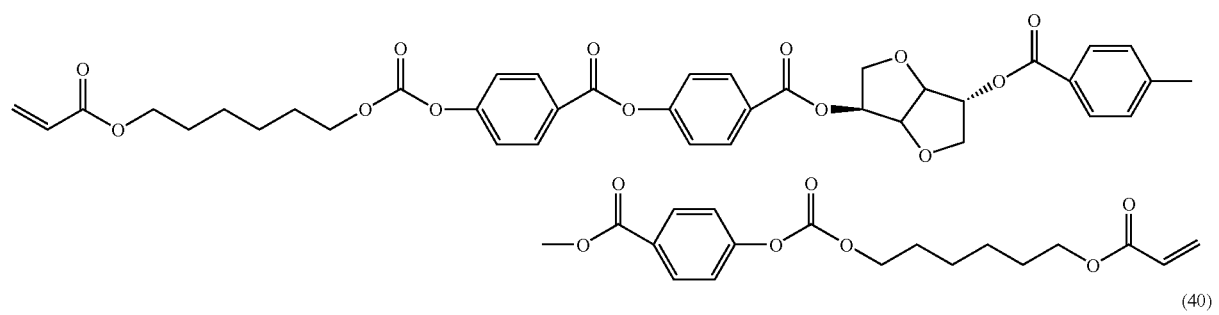
(40)
(41)
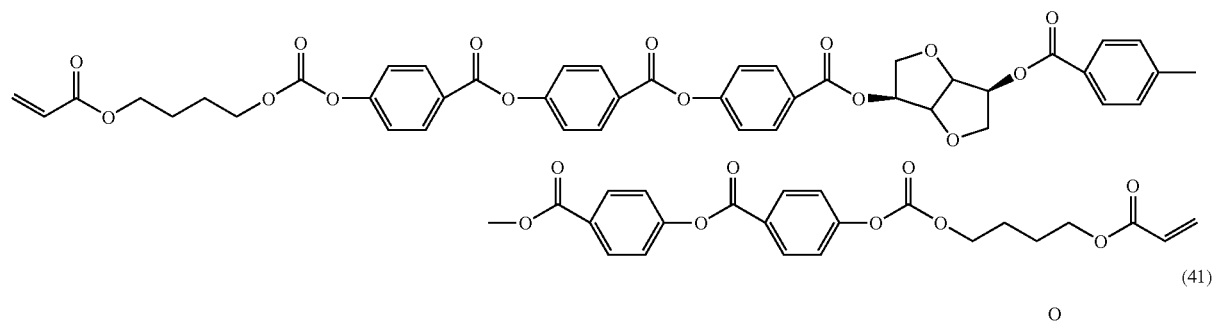
(42)
(43)
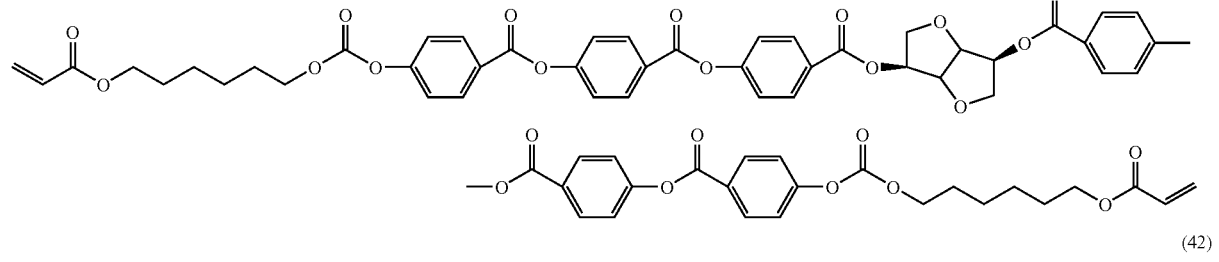
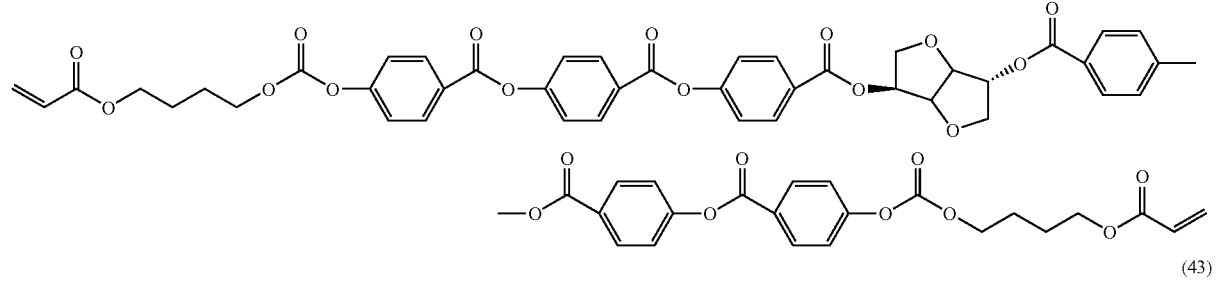
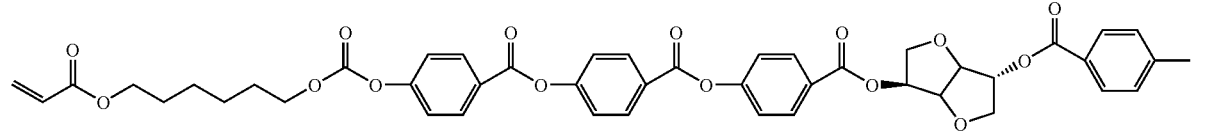

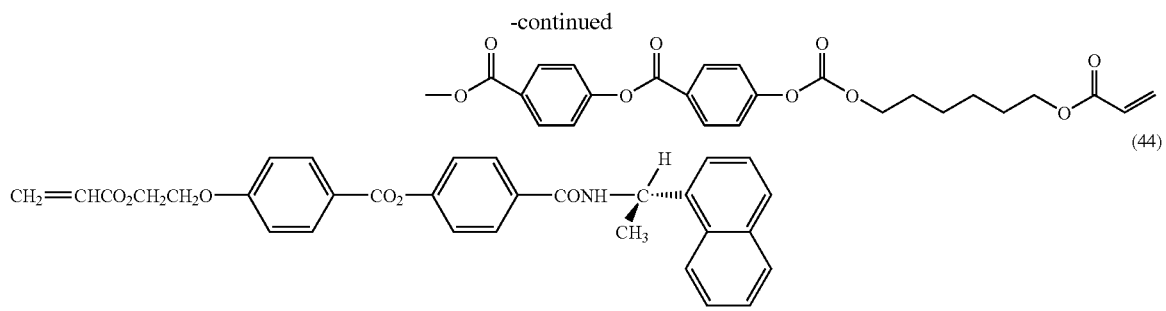

Other than the above-described chiral compounds, chiral compounds mentioned in, for example, DE-A 4342280, German patent applications No. 19520660.6 and No. 19520704.1 can be used preferably.

The polymerizing agent and the crosslinking agent are not particularly limited but can be agents below, for example. As the polymerizing agent, benzoyl peroxide (BPO), azobisisobutyronitrile (AIBN) or the like can be used, for example. As the crosslinking agent, an isocyanate-based crosslinking agent, an epoxy-based crosslinking agent, a metal chelate crosslinking agent or the like can be used, for example. These agents may be used alone or in combination of two or more.

The ratio of the chiral dopant to be added is determined suitably according to a desired selective reflection wavelength range, for example. The addition ratio with respect to the liquid crystal monomer ranges from 5 wt % to 23 wt % and preferably ranges from 10 wt % to 20 wt %. As described above, by controlling the addition ratio of the chiral dopant to the liquid crystal monomer in this manner, the selective reflection wavelength range of an optically compensating B-layer to be formed can be set to the above-mentioned range. When the ratio of the chiral dopant to the liquid crystal monomer is smaller than 5 wt %, it becomes difficult to control the selective reflection wavelength range of an optically compensating B-layer to be formed to a shorter wavelength side. On the other hand, when this ratio is larger than 23 wt %, the temperature range in which the liquid crystal monomer is aligned in a cholesteric manner, that is, the temperature range in which the liquid crystal monomer is in a liquid crystalline phase becomes narrow, so that the temperature in an aligning process, which will be described later, has to be controlled precisely, making the manufacturing difficult.

For example, when chiral dopants with equal helical twisting powers are used, the selective reflection wavelength range to be formed is shifted further to the shorter wavelength side with an increase in the addition ratio of the chiral dopant with respect to the liquid crystal monomer. Also, when the addition ratios of the chiral dopants with respect to the liquid crystal monomer are equal, the selective reflection wavelength range of an optically compensating B-layer to be formed is shifted further to the shorter wavelength side with an increase in the helical twisting power of the chiral dopants. As a specific example, in the case where the selective reflection wavelength range of the optically compensating B-layer to be formed is set to range from 200 to 220 nm, it is appropriate that the chiral dopant having a helical twisting power of $5 \times 10^{-4}$ nm$^{-1}$·(wt %)$^{-1}$ be blended to be 11 wt % to 13 wt % with respect to the liquid crystal monomer, for example. In the case where the selective reflection wavelength range is set to range from 290 to 310 nm, it is appropriate that the chiral dopant having a helical twisting power of $5 \times 10^{-4}$ nm$^{-1}$·(wt %)$^{-1}$ be blended to be 7 wt % to 9 wt % with respect to the liquid crystal monomer, for example.

The combination of the liquid crystal monomer and the chiral dopant is not particularly limited but specifically can be a combination of a monomer agent of the formula (10) above and the chiral dopant of the formula (38) above, that of a monomer agent of the formula (11) above and the chiral dopant of the formula (39) above, or the like.

Further, the addition ratio of the crosslinking agent or the polymerizing agent to the liquid crystal monomer ranges, for example, from 0.1 wt % to 10 wt %, preferably from 0.5 wt % to 8 wt % and more preferably from 1 wt % to 5 wt %. When the ratio of the crosslinking agent or the polymerizing agent to the liquid crystal monomer is equal to or larger than 0.1 wt %, it becomes sufficiently easy to cure the cholesteric liquid crystal layer, for example. When this ratio is equal to or smaller than 10 wt %, the temperature range in which the liquid crystal monomer is aligned in a cholesteric manner, that is, the temperature in which the liquid crystal monomer is in a liquid crystalline phase is sufficient, for example, so that the temperature can be controlled still more easily in the aligning process, which will be described later.

Moreover, for example, various additives may be blended suitably into the coating solution as necessary. Examples of such additives include an antioxidant, a denaturant, a surfactant, a dye, a pigment, a discoloration preventing agent, a UV absorber and the like. These additives may be used alone or in combination of two or more, for example. More specifically, conventionally known materials, for example, phenolic compounds, amine compounds, organic sulfur compounds or phosphinic compounds can be used as the antioxidant, and conventionally known materials, for example, glycols, silicones or alcohols can be used as the denaturant, for example. Furthermore, the surfactant is added, for example, for smoothing the surface of the optical film and can be, for example, a silicone surfactant, an acrylic surfactant, a fluorochemical surfactant or the like. In particular, a silicone surfactant is preferable.

When the liquid crystal monomer is used as above, the prepared coating solution has a viscosity with an excellent workability in application and expanding, for example. The viscosity of the coating solution usually varies depending on the concentration and temperature of the liquid crystal monomer. When the monomer concentration in the coating solution is in the above-noted range of 5 wt % to 70 wt %, the viscosity ranges, for example, from 0.2 to 20 mPa·s, preferably from 0.5 to 15 mPa·s and particularly preferably from 1 to 10 mPa·s. More specifically, when the monomer concentration of the coating solution is 30 wt %, the viscosity ranges, for example, from 2 to 5 mPa·s and preferably from 3 to 4 mPa·s. The coating solution viscosity of equal to or larger than 0.2 mPa·s further prevents the coating solution from flowing undesirably during application, for example, whereas the viscosity of equal to or smaller than 20 mPa·s achieves a still better surface smoothness, further prevents thickness unevenness and allows easy application. Incidentally, although the temperature range from 20° C. to 30° C. has been illustrated for the viscosity described above, there is no particular limitation to this temperature.

Next, the coating solution is applied onto the alignment layer, thus forming the expanded layer.

It is appropriate that the coating solution be flow-expanded by a conventionally known method such as roller coating, spin coating, wire bar coating, dip coating, extrusion method, curtain coating or spray coating. Among these methods, spin coating and extrusion coating are preferable considering the application efficiency.

Subsequently, the expanded layer is subjected to a heat treatment, thereby aligning the liquid crystal monomer in a liquid crystalline state. Since the expanded layer contains the chiral dopant as well as the liquid crystal monomer, the liquid crystal monomer that is now in the liquid crystalline phase (the liquid crystalline state) is aligned while being given a twist by the chiral dopant. In other words, the liquid crystal monomer shows a cholesteric structure (a helical structure).

The temperature condition in the heat treatment can be determined suitably according to, for example, kinds of the liquid crystal monomer, more specifically, the temperature at which the liquid crystal monomer shows a liquid crystal property. Usually, the temperature ranges from 40° C. to 120° C., preferably from 50° C. to 100° C. and more preferably from 60° C. to 90° C. The temperature equal to or higher than 40° C. usually makes it possible to align the liquid crystal monomer sufficiently, whereas the temperature equal to or lower than 120° C. allows a wide range of selectable alignment layers of various kinds as described above considering a thermal resistance, for example.

Next, the expanded layer in which the liquid crystal monomer is aligned is subjected to a crosslinking treatment or a polymerization treatment, thereby polymerizing or crosslinking the liquid crystal monomer and the chiral dopant. In this manner, the liquid crystal monomer is polymerized or crosslinked within itself or with the chiral dopant while maintaining the alignment with the cholesteric structure, so that the alignment is fixed. Thus formed polymer is a non-liquid crystal polymer because the alignment has been fixed.

The polymerization treatment or the crosslinking treatment can be determined suitably depending on, for example, kinds of a polymerizing agent or a cross-linking agent to be used. For example, light irradiation is appropriate in the case of using a photopolymerizing agent or a photo-crosslinking agent, and ultraviolet irradiation is appropriate in the case of using an ultraviolet polymerizing agent or an ultraviolet crosslinking agent.

By the manufacturing method described above, it is possible to provide, on the alignment layer, an optically compensating B-layer that has a selective reflection wavelength range of 350 nm or smaller and that is formed of the non-liquid crystal polymer aligned while having a cholesteric structure. This optically compensating B-layer shows a non-liquid crystal property because its alignment is fixed as described above. Therefore, it does not transform, for example, to a liquid crystalline phase, a glassy phase or a crystal phase according to changes in temperature, so that its alignment does not change with temperature. Consequently, it can be used as a high-performance optically compensating layer that is not affected by temperature change.

The optically compensating B-layer of the present invention is not limited to that manufactured by the above-mentioned method, but the above-mentioned cholesteric liquid crystal polymer can be used as well. It should be noted that the use of the liquid crystal monomer makes it still easier not only to control the selective reflection wavelength range but also to set the viscosity etc. of the coating solution as described above, so that a thin layer can be formed even more easily, leading to an excellent handleability. Moreover, the surface of the formed cholesteric liquid crystal layer achieves an excellent smoothness. Thus, it is possible to form a thinner optically compensating B-layer that has even better quality.

Moreover, the cholesteric liquid crystal layer may be peeled off from the alignment layer and used as it is as an optically compensating B-layer of the present invention, or can be kept laminated on the alignment layer and used as an optically compensating B-layer.

When used as a laminate with the cholesteric liquid crystal layer, the alignment layer is preferably a translucent plastic film. The plastic film can be a film formed of; for example, cellulose such as TAC, polyolefin such as polyethylene, polypropylene or poly(4-methyl pentene-1), polyimide, polyamide imide, polyamide, polyetherimide, polyether ether ketone, polyketone sulfide, polyethersulfone, polysulfone, polyphenylene sulfide, polyphenylene oxide, polyethylene terephthalate, polybutylene terephthalate, polyethylene naphthalate, polyacetal, polycarbonate, polyarylate, an acrylic resin, polyvinyl alcohol polypropylene, cellulose-based plastics, an epoxy resin, a phenolic resin, polynorbornene, polyester, polystyrene, polyvinyl chloride, polyvinylidene chloride, liquid crystal polymer or the like. These films may be optically isotropic or anisotropic. Among these plastic films, films respectively formed of polypropylene, polyethylene terephthalate and polyethylene naphthalate are preferable, for example, considering a solvent resistance and a thermal resistance.

The above-mentioned transparent alignment substrate may be a single layer, for example, or a laminate of different polymers for improving a strength, a thermal resistance and adhesion to the polymer and the liquid crystal monomer, for example.

In addition, the transparent alignment substrate may generate no retardation owing to birefringence, or generate the retardation owing to birefringence for the purpose of canceling the polarization state of light reflected by a polarization separating layer, for example. Such canceling of the polarization state improves an efficiency of light utilization and allows the light to have the same polarization state as light from the light source, so that visual hue variation can be suppressed effectively. The transparent substrate generating the retardation owing to birefringence can be, for example, stretched films of various polymers and may be a substrate whose refractive index in the thickness direction is controlled. This controlling can be carried out by, for example, making the polymer film adhere to a heatshrinkable film and stretching them while heating.

The thickness of the plastic film usually is 5 µm to 500 µm, preferably is 10 to 200 µm and more preferably is 15 to 150 µm. The thickness equal to or larger than 5 µm provides a sufficient strength as the substrate, so that it is possible to prevent a problem of fracture during manufacturing or the like.

Alternatively, the cholesteric liquid crystal layer can be transferred from the alignment layer (in the following, referred to as a "first substrate") to another substrate (in the following, referred to as a "second substrate"), and it can be kept laminated on the second substrate and used as an optically compensating B-layer, for example. More specifically, it is appropriate to laminate an adhesive layer or a pressure-sensitive adhesive layer (in the following, referred to as an "adhesive layer or the like") on at least one surface of the second substrate, bond this adhesive layer or the like to the optical film on the first substrate, and then peel off the first substrate from the cholesteric liquid crystal layer.

In this case, the transparency and thickness of the alignment layer on which the coating solution is expanded are not limited, and the thermal resistance and strength thereof preferably are considered instead when selecting the substrate.

On the other hand, there is no particular limitation on, for example, the thermal resistance etc. of the second substrate. For example, a transparent substrate and a transparent protective film are preferable. More specifically, transparent glass or plastic film can be used. The plastic film can be a film formed of, for example, polymethyl methacrylate, polystyrene, polycarbonate, polyethersulfone, polyphenylene sulfide, polyarylate, polyethylene terephthalate, polyethylene naphthalate, polyolefin, triacetylcellulose, a norbornene-based resin, an epoxy resin or a polyvinyl alcohol-based resin. Other than the above, the polymer film described in JP 2001-343529 A (WO 01/37007) also can be used, for example. The polymer material used can be a resin composition containing a thermoplastic resin whose side chain has a substituted or unsubstituted imido group and a thermoplastic resin whose side chain has a substituted or unsubstituted phenyl group and nitrile group, for example, a resin composition containing an alternating copolymer of isobutene and N-methylene maleimide and a strene-acrylonitrile copolymer. The polymer film may be formed by extruding the resin composition. Other than the above, a coating polarizer also can be used as a second polarizer.

Although the second substrate preferably is optically isotropic, it may be optically anisotropic depending on the intended use of the optical film. Such a second substrate having an optical anisotropy may be, for example, a retardation film obtained by stretching the above-mentioned plastic film, a light-scattering film having a light-scattering property, a diffraction film having a diffraction ability or a is polarizing film.

In the case of using the laminate of the cholesteric liquid crystal layer and the transparent substrate of various kinds, the cholesteric liquid crystal layer may be laminated on both surfaces of the transparent substrate. The number of the cholesteric liquid crystal layers may be one or at least two.

According to the manufacturing method, a cholesteric liquid crystal layer is formed on the alignment layer, thereby providing an optically compensating B-layer. Each layer composing the optically compensating B-layer has a thickness of for example, from 1 μm to 50 μm, and preferably, from 2 μm to 30 μm.

The polarizing layer is not particularly limited but can be a film prepared by a conventionally known method of, for example, dyeing by allowing a film of various kinds to adsorb a dichroic material such as iodine or a dichroic dye, followed by crosslinking, stretching and drying. Especially, films that transmit linearly polarized light when natural light is made to enter those films are preferable, and films having excellent light transmittance and polarization degree are preferable. Examples of the film of various kinds in which the dichroic material is to be adsorbed include hydrophilic polymer films such as polyvinyl alcohol (PVA)-based films, partially-formalized PVA-based films, partially-saponified films based on ethylene-vinyl acetate copolymer and cellulose-based films. Other than the above, polyene aligned films such as dehydrated PVA and dehydrochliorinated polyvinyl chloride can be used, for example. Among them, the PVA-based film is preferable.

Though the thickness of the polarizing layer is not particularly limited, for example, it is from 1 μm to 80 μm, and preferably, from 2 μm to 40 μm. Preferably, the polarizing layer (polarizing film) has an absorption axis in a direction of stretching the polarizing layer (polarizing film) and perpendicular to a short axis of the polarizing layer (polarizing film).

A transparent protective film functioning as a protective layer can be adhered to at least one surface of the polarizing layer (polarizing film) via a suitable adhesive layer.

The protective layer is not particularly limited but can be a conventionally known transparent film. For example, transparent protective films having excellent transparency, mechanical strength, thermal stability, moisture shielding property and isotropism are preferable. Specific examples of materials for such a transparent protective layer can include cellulose-based resins such as triacetylcellulose, and transparent resins based on polyester, polycarbonate, polyamide, polyimide, polyethersulfone, polysulfone, polystyrene, polynorbornene, polyolefin, acrylic substances, acetate and the like. Thermosetting resins or ultraviolet-curing resins based on the acrylic substances, urethane, acrylic urethane, epoxy, silicones and the like can be used as well. Among them, a TAC film having a surface saponified with alkali or the like is preferable in light of the polarization property and durability.

Moreover, for a protective film, the polymer film described in JP 2001-343529 A (WO 01/37007) also can be used. The polymer material used can be a resin composition containing a thermoplastic resin whose side chain has a substituted or unsubtituted imido group and a thermoplastic resin whose side chain has a substituted or unsubstituted phenyl group and nitrile group, for example, a resin composition containing an alternating copolymer of isobutene and N-methylene maleimide and an styrene-acrylonitrile copolymer. Alternatively, the polymer film may be formed by extruding the resin composition.

It is preferable that the protective layer is colorless. More specifically, a retardation value (Rth) of the film in its thickness direction as represented by the equation below preferably ranges from −90 nm to +75 nm, more preferably ranges from −80 nm to +60 nm, and particularly preferably ranges from −70 nm to +45 nm. When the retardation value is within the range of −90 nm to +75 nm, coloration (optical coloration) of the polarizing plate, which is caused by the protective film, can be solved sufficiently. In the equation below, nx, ny and nz respectively denote refractive indices of X axis, Y axis and Z axis. The X axis denotes an axial direction presenting a maximum refractive index within the protective layer, the Y axis denotes an axial direction perpendicular to the X axis within the protective layer, and the Z axis denotes a thickness direction perpendicular to the X axis and the Y axis, while 'd' denotes a thickness of the protective layer.

$$Rth=[\{(nx+ny)/2\}-nz]\cdot d$$

The transparent protective layer further may have an optically compensating function. As such a transparent protective layer having the optically compensating function, it is possible to use, for example, a known layer used for preventing coloration or for widening a preferable viewing angle caused by changes in a visible angle based on retardation in a liquid crystal cell. Specific examples include various films obtained by stretching the above-described transparent resins uniaxially or biaxially, an aligned film of a liquid crystal polymer or the like, and a laminate obtained by providing an aligned layer of a liquid crystal polymer on a transparent base. Among the above, the aligned film of a liquid crystal polymer is preferable because a wide viewing angle with excellent visibility can be achieved. Particularly preferable is an optically compensating retardation plate obtained by supporting an optically compensating layer with the above-mentioned triacetylcellulose film or the like, where the optically compensating layer is made of an incline-aligned layer of a discotic or nematic liquid crystal polymer. This optically compensating retardation plate can be a commercially available product, for example, "WV film" manufactured by Fuji Photo Film Co., Ltd. Alternatively, the optically compensating retardation plate can be prepared by laminating two or more layers of the retardation film and the film support of triacetylcellulose film or the like so as to control the optical characteristics such as retardation.

The thickness of the transparent protective layer is not particularly limited but can be determined suitably according to retardation or a protective strength, for example. In general, the thickness of the transparent protective layer is in the range not greater than 500 μm, preferably from 5 μm to 300 μm, and more preferably from 5 μm to 150 μm.

The transparent protective layer can be formed suitably by a conventionally known method such as a method of applying a polarizing film with the above-mentioned various transparent resins or a method of laminating the transparent resin film, the optically compensating retardation plate or the like on the polarizing film, or can be a commercially available product.

The transparent protective layer further may be subjected to, for example, a hard coating treatment, an antireflection treatment, treatments for antisticling, diffusion and antiglaring and the like. The hard coating treatment aims to prevent scratches on the surfaces of the polarizing plate, and is a treatment of, for example, providing a hardened coating film that is formed of a curable resin and has excellent hardness and smoothness onto a surface of the transparent protective layer. The curable resin can be, for example, ultraviolet-curing resins of silicone base, urethane base, acrylic, and epoxy base. The treatment can be carried out by a conventionally known method. The antisticking treatment aims at preventing adjacent layers from sticking to each other. The antireflection treatment aims to prevent reflection of external light on the surface of the polarizing plate, and can be carried out by forming a conventionally known antireflection layer or the like.

The anti-glare treatment aims at preventing reflection of external light on the polarizing plate surface from hindering visibility of light transmitted through the polarizing plate. The antiglare treatment can be carried out, for example, by providing microscopic asperities on a surface of the transparent protective layer by a conventionally known method. Such microscopic asperities can be provided, for example, by roughening the surface by sand-blasting or embossing, or by blending transparent fine particles in the above-described transparent resin when forming the transparent protective layer.

The abovedescribed transparent fine particles may be silica, alumina, titania, zirconia, stannic oxide, indium oxide, cadmium oxide, antimony oxide or the like. Other than the above, inorganic fine particles having an electrical conductivity or organic fine particles comprising, for example, crosslinked or uncrosslinked polymer particles can be used as well. The average particle diameter of the transparent fine particles ranges, for example, from 0.5 to 20 μm, though there is no particular limitation. In general, a blend ratio of the transparent fine particles preferably ranges from 2 to 70 parts by weight, and more preferably ranges from 5 to 50 parts by weight with respect to 100 parts by weight of the above-described transparent resin, though there is no particular limitation.

An antiglare layer in which the transparent fine particles are blended can be used as the transparent protective layer itself or provided as a coating layer applied onto the transparent protective layer surface. Furthermore, the antiglare layer also can function as a diffusion layer to diffuse light transmitted through the polarizing plate in order to widen the viewing angle (i.e., visually-compensating function).

The antireflection layer, the anti-sticking layer, the diffusion layer and the anti-glare layer mentioned above can be laminated on the polarizing plate, as a sheet of optical layers comprising these layers, separately from the transparent protective layer.

When transparent protective films are formed on both surfaces of the polarizing layer, the films can contain polymers different from each other. Alternatively, the optically compensating A-layer or the optically compensating B-layer can be used for a protective film for one surface of the polarizing plate. Such a configuration is preferred since the thickness of the layer can be decreased.

The method of laminating the polarizing layer and the transparent protective film as a protective layer is not particularly limited but a conventionally known method can be applied. In general, the kinds can be determined suitably depending on the materials or the like of the components. The adhesives can be, for example, a polymer-based adhesive containing, for example, acrylic materials, vinyl alcohol, silicone, polyester, polyurethane, and polyether; and a rubber-based adhesive. The above-mentioned pressure-sensitive adhesives and adhesives are difficult to peel even under an influence of humidity and heat, and they have excellent optical transparency and polarization.

Specifically, when the polarizer is a PVA-based film, a PVA-based adhesive is preferred in light of stability of adhesion treatment. These adhesive and pressure-sensitive adhesive may be applied directly to surfaces of the polarizer and the transparent protective layer, or a layer of a tape or a sheet formed of the adhesive or pressure-sensitive adhesive may be arranged on the surfaces thereof. Further, when these adhesives are prepared as an aqueous solution, for example, other additives or a catalyst such as an acid may be blended as necessary. For applying the adhesive, for example, other additives and catalysts such as acids can be included further in the aqueous solution of the adhesive.

Though the thickness of the adhesive layer is not particularly limited, for example, it is from 1 nm to 500 nm, preferably from 10 nm to 300 nm, and more preferably, from 20 nm to 100 nm.

By laminating the above-mentioned polarizing layer, the optically compensating A-layer and the optically compensating B-layer, a polarizing plate with optical compensation function according to the present invention can be manufactured. When laminating the polarizing layer and the optically compensating A-layer, it is preferable that an angle formed by directions of an absorption axis of the polarizing layer and a slow axis of the optically compensating A-layer will be not smaller than 85° and not larger than 95°. Since the absorption axis of the polarizing layer is perpendicular to the short axis of the polarizing layer, and since the slow axis of the optically compensating A-layer is parallel to the short axis of the stretched polymer film when manufactured by a tenter transverse stretching, the polarizing layer and the optically compensating A-layer can be laminated so that the longer side of the layers will overlap each other, thereby obtaining the above-mentioned relationship easily. When such a lamination of the layers with the longer sides overlapping each other is available, a so-called "roll-to-roll" manufacture is realized, thereby improving the efficiency in manufacturing.

The method of laminating the polarizing layer, the optically compensating A-layer and the optically compensating B-layer is not particularly limited, but conventionally known methods can be applied. For example, the polarizing layer, the optically compensating A-layer and the optically compensating B-layer are prepared separately and laminated respectively. In this lamination method, the pressure-sensitive adhesive and the adhesive as mentioned above can be used without any particular limitations. When the optically compensating B-layer is formed separately on a base, the base can be included in the laminate, or the base can be removed after the lamination so as to transfer the optically compensating B-layer. Alternative methods of laminating the polarizing layer, the optically compensating A-layer and the optically compensating B-layer include (1) manufacturing previously a laminate (film) of an optically compensating A-layer and a polarizing layer, and further laminating an optically compensating B-layer thereon; (2) manufacturing previously a laminate (film) of an optically compensating B-layer and a polarizing layer, and further laminating an optically compensating A-layer thereon; (3) laminating an optically compensating A-layer and a optically compensating B-layer previously for forming an optically compensating layer, and further laminating a polarizing layer (film) on the optically compensating layer.

The method of manufacturing the laminate of the polarizing layer (film) and the optically compensating A-layer in the above-mentioned (1) is not particularly limited, but conventionally known methods can be applied. In general, the above-mentioned pressure-sensitive adhesive and the adhesive can be used, and the type can be determined suitably depending on the materials or the like of the respective components. For example, the polarizing layer and the optically compensating A-layer prepared respectively can be laminated by using a pressure-sensitive adhesive or an adhesive.

A method of laminating further an optically compensating B-layer on a laminate including a polarizing layer and an optically compensating A-layer can be selected from (a) treating (e.g., rubbing) the optically compensating A-layer in order to provide a function as an alignment layer, and forming an optically compensating B-layer on the optically compensating A-layer; (b) forming an alignment layer on an optically compensating A-layer and forming an optically compensating B-layer on the alignment layer; and (c) forming an optically compensating B-layer on an alignment base separately prepared, and transferring the optically compensating B-layer onto an optically compensating A-layer via an adhesive or a pressure-sensitive adhesive. When applying the method (c), the alignment base can be removed or maintained after transferring the optically compensating B-layer.

Next, specific embodiments for the polarizing plates with optical compensation function according to the present invention will be described by referring to FIGS. 2-7.

Figure 2:
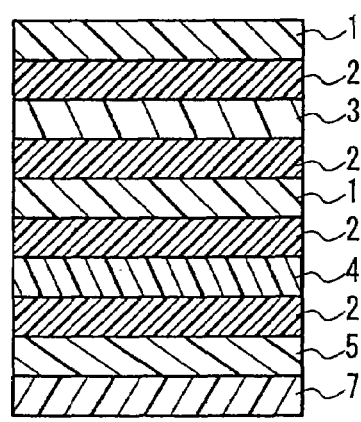
FIG. 2 is a perspective view showing a direction for bonding a polarizing layer and an optically compensating A-layer.
Figure 3:
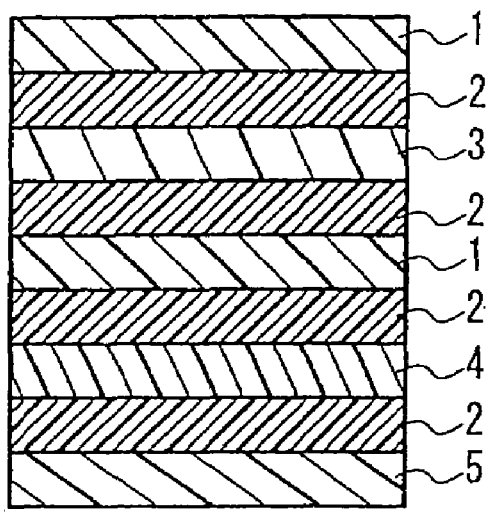
FIG. 3 is a schematic cross sectional view showing an example of a polarizing plate with optical compensation function according to the present invention.

FIG. 2 shows a polarizing plate with optical compensation function according to the present invention, configured by: laminating protective layers 1 on both surfaces of a polarizing layer 3 via adhesive layers 2; laminating an optically compensating A-layer 4 on a surface of one of the protective layers 1 via an adhesive layer 2; and further laminating, on the optically compensating A-layer 4 via an adhesive layer 2, an optically compensating B-layer 5 formed on a supporting base 7. FIG. 3 shows an example of a polarizing plate with optical compensation function according to the present invention, from which the supporting base 7 has been removed.

Figure 4:
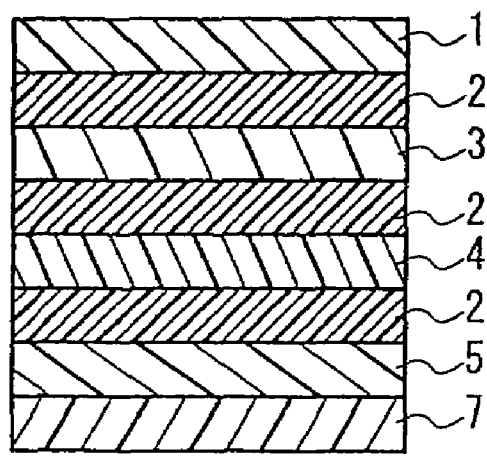
FIG. 4 is a schematic cross sectional view showing another example of a polarizing plate with optical compensation function according to the present invention.
Figure 5:
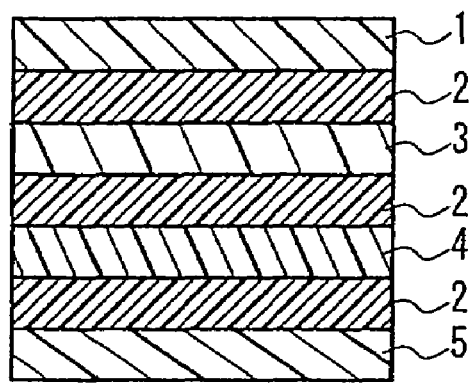
FIG. 5 is a schematic cross-sectional view showing another example of a polarizing plate with optical compensation function according to the present invention.

FIG. 4 shows a polarizing plate with optical compensation function according to the present invention, configured by: laminating a protective layer 1 on one surface of a polarizing layer 3 via an adhesive layer 2, and laminating an optically compensating A-layer 4 on the other surface via an adhesive layer 2; laminating further on the optically compensating A-layer 4 via an adhesive layer 2, an optically compensating B-layer 5 formed on a supporting base 7. FIG. 5 shows an example of the polarizing plate with optical compensation function according to the present invention, from which the supporting base 7 has been removed.

Figure 6:
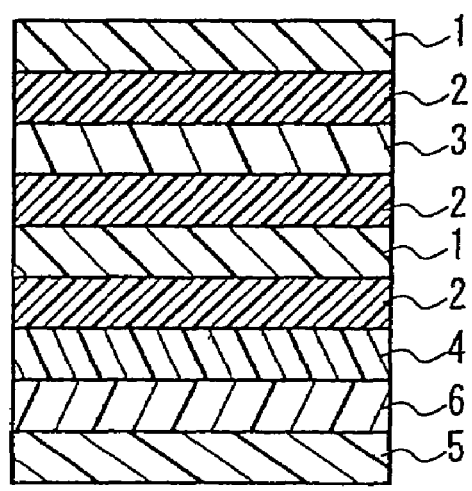
FIG. 6 is a schematic cross sectional view showing another example of a polarizing plate with optical compensation function according to the present invention.

FIG. 6 shows a polarizing plate with optical compensation function according to the present invention, configured by: laminating protective layers 1 on both surfaces of a polarizing layer 3 via adhesive layers 2; laminating an optically compensating A-layer 4 on a surface of one of the protective layers 1 via an adhesive layer 2; further laminating an alignment layer 6 on the optically compensating A-layer 4, and forming an optically compensating B-layer 5 on the alignment layer 6.

Figure 7:
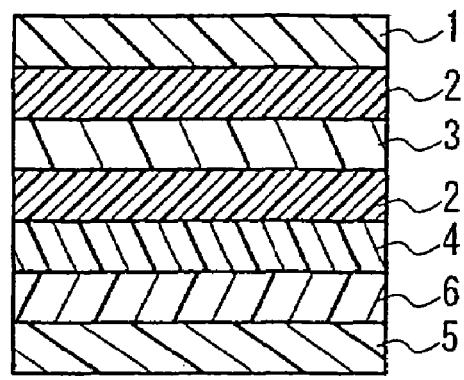
FIG. 7 is a schematic cross sectional view showing another example of a polarizing plate with optical compensation function according to the present invention.

FIG. 7 shows a polarizing plate with optical compensation function according to the present invention, configured by: laminating a protective layer 1 on one surface of a polarizing layer 3 via an adhesive layer 2, and laminating, on the other surface, an optically compensating A-layer 4 via an adhesive layer 2; further forming an alignment layer 6 on the optically compensating A-layer 4; and forming an optically compensating B-layer 5 on the alignment layer 6.

Next, a method of laminating further an optically compensating A-layer on a laminate of an optically compensating B-layer and a polarizing layer (film) as shown in (2) will be explained below. A method of manufacturing a laminate of an optically compensating B-layer and a polarizing layer is not particularly limited, but the above-mentioned conventional methods can be applied. The examples are: (a) treating (e.g., rubbing) a polarizing layer in order to provide a function as an alignment layer, and forming an optically compensating B-layer on the polarizing layer; (b) forming an alignment layer on a polarizing layer and forming an optically compensating B-layer on the alignment layer; and (c) forming an optically compensating B-layer on an alignment base separately prepared, and transferring the optically compensating B-layer onto a polarizing layer via an adhesive or a pressure-sensitive adhesive. When using the method (c), the alignment base can be removed or maintained after transferring the optically compensating B-layer.

A method of further laminating an optically compensating A-layer on the laminate including the polarizing layer and the optically compensating B-layer is not particularly limited, but the above-mentioned conventionally known methods can be applied.

Next, specific embodiments for the polarizing plate with optical compensation function according to the present invention will be described by referring to FIGS. 8 and 9.

Figure 8:
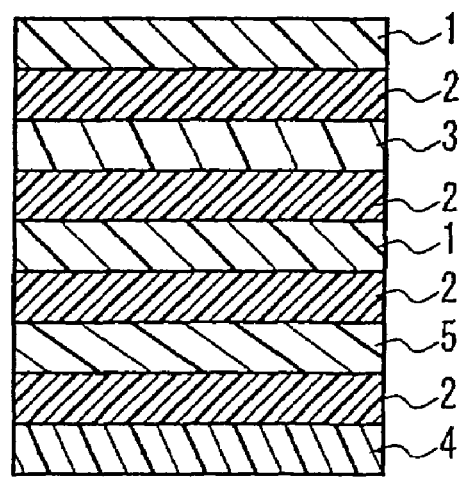
FIG. 8 is a schematic cross-sectional view showing another example of a polarizing plate with optical compensation function according to the present invention.

FIG. 8 shows a polarizing plate with optical compensation function according to the present invention, configured by: laminating protective layers 1 on both surfaces of a polarizing layer 3 via adhesive layers 2; laminating, on a surface of one of the protective layers 1 via an adhesive layer 2, an optically compensating B-layer 5 formed on a supporting base (not shown), from which the base is removed; and further laminating an optically compensating A-layer 4 on the optically compensating B-layer 5 via an adhesive layer 2.

Figure 9:
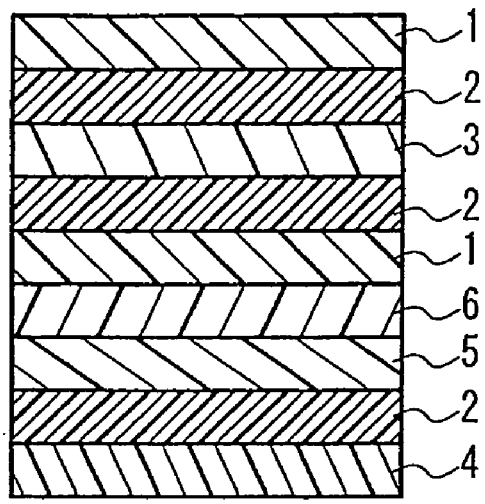
FIG. 9 is a schematic cross-sectional view showing another example of a polarizing plate with optical compensation function according to the present invention.

FIG. 9 shows a polarizing plate with optical compensation function according to the present invention, configured by: laminating protective layers 1 on both surfaces of a polarizing layer 3 via adhesive layers 2; forming an alignment layer 6 on a surface of one of the protective layers 1 and forming an optically compensating B-layer 5 thereon; and further laminating an optically compensating A-layer 4 on the optically compensating B-layer 5 via an adhesive layer 2.

The following description is about a method of forming an optically compensating layer by previously laminating an optically compensating A-layer and an optically compensating B-layer, and further laminating a polarizing layer (film) on the optically compensating layer.

A method of laminating previously an optically compensating A-layer and an optically compensating B-layer can be selected from (a) treating (e g., rubbing) the optically compensating A-layer in order to provide a function as an alignment layer, and forming an optically compensating B-layer on the optically compensating A-layer; (b) forming an alignment layer on an optically compensating A-layer and forming an optically compensating B-layer on the alignment layer; and (c) forming an optically compensating B-layer on an alignment base separately prepared, and transferring the optically compensating B-layer onto an optically compensating A-layer via an adhesive or a pressure-sensitive adhesive. When using the method (c), the alignment base can be removed or maintained after transferring the optically compensating B-layer.

A method of laminating on a polarizing layer (film) a laminate including an optically compensating A-layer and an optically compensating B-layer is not particularly limited, but the above-mentioned conventionally known methods can be applied. When laminating on the polarizing layer the laminate including the optically compensating A-layer and the optically compensating B-layer, any of the optically compensating A-layer and the optically compensating B-layer can face the polarizing layer.

Next, specific embodiments for polarizing plates with optical compensation function according to the present invention will be described by referring to FIGS. 10-12.

Figure 10:
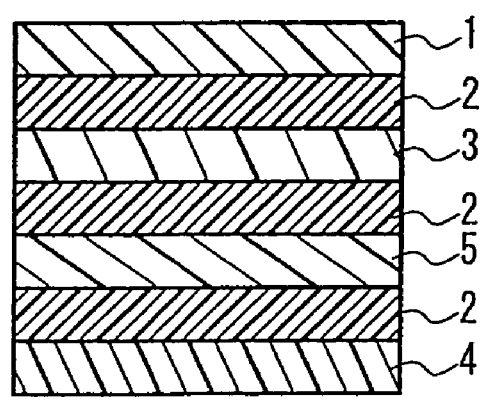
FIG. 10 is a schematic cross-sectional view showing another example of a polarizing plate with optical compensation function according to the present invention.

FIG. 10 shows a polarizing plate with optical compensation function according to the present invention, configured by: laminating, on an optically compensating A-layer 4 via an adhesive layer 2, an optically compensating B-layer 5 formed on a supporting base (not shown), removing the base; laminating the laminate on one surface of the polarizing layer 3 via an adhesive layer 2 so that the optically compensating B-layer of the laminate will face the polarizing layer 3; and laminating a protective layer 1 on the other surface of the polarizing layer 3 via an adhesive layer 2.

Figure 11:
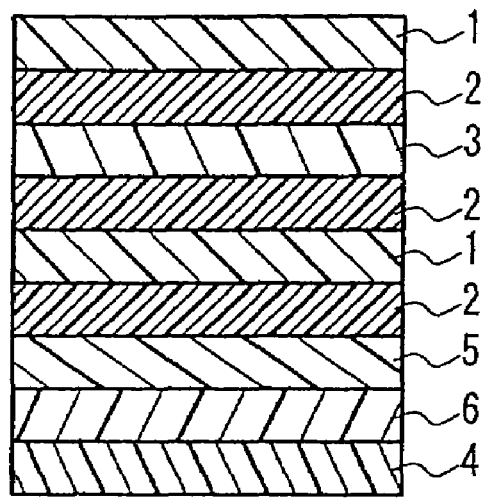
FIG. 11 is a schematic cross-sectional view showing another example of a polarizing plate with optical compensation function according to the present invention.
Figure 12:
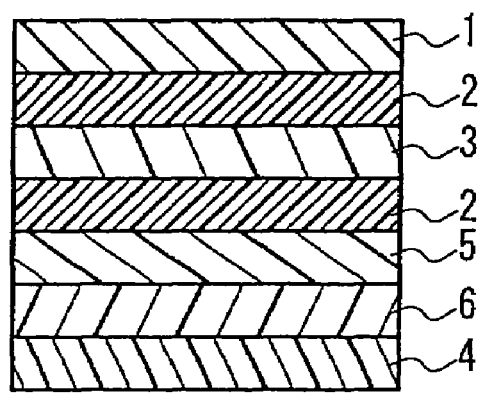
FIG. 12 is a schematic cross-sectional view showing another example of a polarizing plate with optical compensation function according to the present invention.

FIG. 11 shows a polarizing plate with optical compensation function according to the present invention, configured by: forming an alignment layer 6 on an optically compensating A-layer 4 and forming thereon an optically compensating B-layer 5 so as to manufacture a laminate; laminating separately protective layers 1 on both surfaces of a polarizing layer 3 via adhesive layers 2; laminating the laminate on a surface of one of the protective layers 1 via an adhesive layer 2 so that the optically compensating B-layer 5 faces the protective layer 1. FIG. 12 shows an example where the laminate is laminated on one surface of the polarizing layer 3 while the protective layer 1 is laminated on the other surface of the polarizing layer 3 respectively via adhesive layers 2. The laminate is provided so that the optically compensating B-layer 5 faces the polarizing layer 3.

The polarizing plate with optical compensation function according to the present invention can include in use an additional optical layer together with the polarizing plate of the present invention. Examples of the optical layers include various optical layers that have been conventionally known and used for forming liquid crystal displays or the like, such as a polarizing plate, a reflector, a semitransparent reflector, and a brightness-enhancement film as mentioned below. These optical layers can be used alone or in combination of at least two kinds of layers. Such an optical layer can be provided as a single layer, or at least two optical layers can be laminated. A polarizing plate with optical compensation function, which further includes such an optical layer, is used preferably as an integrated polarizing plate having an optical compensation function, and it can be arranged on a surface of a liquid crystal cell, for example, so as to be used suitably for various image displays.

The integrated polarizing plate will be described below.

First, an example of a reflective polarizing plate or a semi-transparent reflective polarizing plate will be described. The reflective polarizing plate is prepared by laminating further a reflector on a polarizing plate with optical compensation function according to the present invention, and the semi-transparent reflective polarizing plate is prepared by laminating a semitransparent reflector on a polarizing plate with optical compensation function according to the present invention.

In general, such a reflective polarizing plate is arranged on a backside of a liquid crystal cell in order to make a liquid crystal display (reflective liquid crystal display) to reflect incident light from a visible side (display side). The reflective polarizing plate has some merits, for example, assembling of light sources such as backlight can be omitted, and the liquid crystal display can be thinned further.

The reflective polarizing plate can be formed in any known manner such as forming a reflector of metal or the like on one surface of a polarizing plate having a certain elastic modulus. More specifically, one example thereof is a reflective polarizing plate formed by matting one surface (surface to be exposed) of a transparent protective layer of the polarizing plate as required, and providing the surface with a deposited film or a metal foil comprising a reflective metal such as aluminum.

An additional example of a reflective polarizing plate is prepared by forming, on a transparent protective layer having a surface with microscopic asperities due to microparticles contained in various transparent resins, a reflector corresponding to the microscopic asperities. The reflector having a microscopic asperity surface diffuses incident light irregularly so that directivity and glare can be prevented and irregularity in color tones can be controlled. The reflector can be formed by attaching the metal foil or the metal deposited film directly on an asperity surface of the transparent protective layer in any conventional and appropriate methods including deposition such as vacuum deposition, and plating such as ion plating and sputtering.

As mentioned above, the reflector can be formed directly on a transparent protective layer of a polarizing plate. Alternatively, the reflector can be used as a reflecting sheet formed by providing a reflecting layer onto a proper film similar to the transparent protective film. Since a typical reflecting layer of a reflector is made of a metal, it is preferably used in a state that the reflecting surface is coated with the film, a polarizing plate or the like in order to prevent a reduction of the reflection rate due to oxidation, furthermore, the initial reflection rate is maintained for a long period, and avoiding a separate formation of a transparent protective layer.

A semitransparent polarizing plate is provided by replacing the reflector in the above-mentioned reflective polarizing plate by a semitransparent reflector, and it is exemplified by a half mirror that reflects and transmits light at the reflecting layer.

In general, such a semitransparent polarizing plate is arranged on a backside of a liquid crystal cell. In a liquid crystal display including the semitransparent polarizing plate, incident light from the visible side (display side) is reflected to display an image when a liquid crystal display is used in a relatively bright atmosphere, while in a relatively dark atmosphere, an image is displayed by using a built-in light source such as a backlight on the backside of the semitransparent polarizing plate. In other words, the semitransparent polarizing plate can be used to form a liquid crystal display that can save energy for a light source such as a backlight under a bright atmosphere, while a built-in light source can be used under a relatively dark atmosphere.

The following description is about an example of a polarizing plate prepared by further laminating a brightness-enhancement film on a polarizing plate with optical compensation function according to the present invention.

A suitable example of the brightness-enhancement film is not particularly limited, but it can be selected from a multilayer thin film of a dielectric or a multilayer lamination of thin films with varied refraction aeolotropy (for example, trade name: "D-BEF" manufactured by 3M Co.) that transmits linearly polarized light having a predetermined polarization axis while reflecting other light, and a cholesteric liquid crystal layer, more specifically, an aligned film of a cholesteric liquid crystal polymer or an aligned liquid crystal layer fixed onto a supportive film substrate (for example, trade name: "PCF 350" manufactured by Nitto Denko Corporation; trade name: Transmax manufactured by Merck and Co., Inc.) that reflects either clockwise or counterclockwise circularly polarized light while transmitting other light.

An example of the various polarizing plates of the present invention can be an optical member including two or ore optical layers, which is formed by laminating an additional optical layer and the above-mentioned laminated polarizing plate including a birefringent layer.

An optical member comprising a laminate of at least two optical layers can be formed, for example, by a method of laminating layers separately in a certain order for manufacturing a liquid crystal display or the like. However, since an optical member that has been laminated previously has excellent stability in quality and assembling operability, efficiency in manufacturing a liquid crystal display can be improved. Any appropriate adhesives such as a pressure-sensitive adhesive layer can be used for lamination.

Moreover, it is preferable that the polarizing plate with optical compensation function according to the present invention further has a pressure sensitive adhesive layer or an adhesive layer so as to allow easier lamination onto the other members such as a liquid crystal cell. They can be arranged on one surface or both surfaces of the polarizing plate. The material of the pressure-sensitive adhesive layer is not particularly limited but can be a conventionally known material such as acrylic polymers. Further, the pressure-sensitive adhesive layer having a low moisture absorption coefficient and an excellent thermal resistance is preferable from the aspects of prevention of foaming or peeling caused by moisture absorption, prevention of degradation in the optical characteristics and warping of a liquid crystal cell caused by difference in thermal expansion coefficients and formation of an image display apparatus with high quality and excellent durability. It also may be possible to incorporate fine particles so as to form the pressure-sensitive adhesive layer showing light diffusion property. For the purpose of forming the pressure-sensitive adhesive layer on the surface of the polarizing plate, a solution or melt of a sticking material can be applied directly on a predetermined surface of the polarizing plate by a development method such as flow-expansion and coating. Alternatively, a pressure-sensitive adhesive layer can be formed on a separator, which will be described below, in the same manner and transferred to a predetermined surface of the polarizing plate. Such a layer can be formed on any surface of the polarizing plate. For example, it can be formed on an exposed surface of the optically compensation layer of the polarizing plate.

When a surface of a layer of an adhesive or a pressure-sensitive adhesive provided on the polarizing plate is exposed, preferably, the pressure-sensitive adhesive layer is covered with a separator until the time the pressure-sensitive adhesive layer is used so that contamination will be prevented. The separator can be formed by coating, on a proper film such as the transparent protective film, a peeling layer including a peeling agent containing silicone, long-chain alkyl, fluorine, molybdenum sulfide or the like as required.

The pressure-sensitive adhesive layer or the like can be a monolayer or a laminate. The laminate can be a combination of monolayers different from each other in the type or in the compositions. Pressure-sensitive adhesive layers arranged on both surfaces of the polarizing plate can be the same or different from each other in the type or in the compositions.

The thickness of the pressure-sensitive adhesive layer can be determined appropriately depending on the constituents or the like of the polarizing plate. In general, the thickness of the pressure-sensitive adhesive layer is 1 μm to 500 μm.

It is preferable that the pressure-sensitive adhesive layer is made of a pressure-sensitive adhesive having excellent optical transparency and sticking characteristics such as wettability, cohesiveness, and adhesiveness. For specific example, the pressure-sensitive adhesive can be prepared appropriately based on polymers such as an acrylic polymer, a silicone-based polymer, polyester, polyurethane, polyether, and synthetic rubber.

Sticking property of the pressure-sensitive adhesive layer can be controlled appropriately in a known method. For example, the degree of cross-linkage and the molecular weight will be adjusted on the basis of a composition or molecular weight of the base polymer of the pressure-sensitive layer, crosslinking type, a content of the crosslinking functional group, and an amount of the blended crosslinking agent.

The respective layers such as a polarizing film, a transparent protective layer, an optical layer and a pressure-sensitive adhesive layer for composing various optical members of various polarizing plates having additional laminates of optical layers and the above-described polarizing plate with optical compensation function according to the present invention can have ultraviolet absorption power as a result of treatment with an ultraviolet absorber such as a salicylate compound, a benzophenone compound, a benzotriazole compound, a cyanoacrylate compound, and a nickel complex salt compound.

As mentioned above, polarizing plates with optical compensation function according to the present invention can be used preferably for forming various devices such as liquid crystal displays. For example, a polarizing plate is arranged on at least one surface of a liquid crystal cell in order to form a liquid crystal panel used in a liquid crystal display of; e.g., a transmission type, a reflection type, or a transmission-reflection type.

A liquid crystal cell to compose the liquid crystal display can be selected from appropriate cells such as active matrix driving type represented by a thin film transistor, a simple matrix driving type represented by a twist nematic type and a super twist nematic type. Since the polarizing plates with optical compensation function according to the present invention are excellent particularly in optical compensation of a VA (Vertical Aligned) cell they are used particularly preferably for viewing-angle compensating films for VA mode liquid crystal displays.

In general, a typical liquid crystal cell is composed of opposing liquid crystal cell substrates and a liquid crystal injected into a space between the substrates. The liquid crystal cell substrates can be made of glass, plastics or the like without any particular limitations. Materials for the plastic substrates can be selected from conventionally known materials without any particular limitations.

When polarizing plates or optical members are arranged on both surfaces of a liquid crystal panel, the polarizing plates or the optical members on the surfaces can be the same or different type. Moreover, for forming a liquid crystal display, one or more layers of appropriate members such as a prism array sheet, a lens array sheet, an optical diffuser and a backlight can be arranged at proper positions.

The liquid crystal display according to the present invention is not particularly limited as long as it includes the polarizing plate with optical compensation function according to the present invention as a polarizing plate. When it includes further a light source, preferably, the light source is a flat light source emitting polarized light for enabling effective use of light energy, though there is no particular limitation.

The liquid crystal display according to the present invention can include additional member(s) on the visible side optical film (polarizing plate). The member can be selected from, for example, a diffusion plate, an anti-glare layer, an antireflection film, a protective layer, and a protective plate. Alternatively, a compensating retardation plate or the like can be disposed suitably between the liquid crystal cell and the polarizing plate in the liquid crystal panel.

The polarizing plate with optical compensation function according to the present invention can be used not only in the above-described liquid crystal display but also in, for example, self-light-emitting displays such as an organic electroluminescence (EL) display, a plasma display (PD) and a field emission display (FED).

The following is a specific description of an electroluminescence (EL) display comprising a polarizing plate with optical compensation function according to the present invention. The EL display of the present invention is a display having the polarizing plate with optical compensation function according to the present invention, and can be either an organic EL display or an inorganic EL display.

In recent EL displays, for preventing reflection from an electrode in a black state in an EL display, use of an optical film such as a polarizer and a polarizing plate as well as a λ/4 plate is proposed. The polarizing plate with optical compensation function according to the present invention are especially useful when linearly polarized light, circularly polarized light or elliptically polarized light is emitted from an EL layer. The polarizing plate with optical compensation function according to the present invention is especially useful even when an oblique light beam is partially polarized even in the case where natural light is emitted in a front direction.

First, a typical organic EL display will be explained below. In general, such an organic EL display has a luminant (organic EL ruminant) that is prepared by laminating a transparent electrode, an organic lumuiant layer and a metal electrode in this order on a transparent substrate. Here, the organic luminant layer is a laminate of various organic thin films. Examples thereof include various combinations such as a laminate of a hole injection layer made of a triphenylamine derivative or the like and a luminant layer made of a phosphorous organic solid such as anthracene; a laminate of the luminant layer and an electron injection layer made of a perylene derivative or the like; and a laminate of the hole injection layer, the luminant layer and the electron injection layer.

In general, the organic EL display emits light on the following principle: a voltage is applied to the anode and the cathode so as to inject holes and electrons into the organic luminant layer, energy generated by the re-bonding of these holes and electrons excites the phosphor, and the excited phosphor emits light when it returns to the basis state. The mechanism of the re-bonding of these holes and electrons during the process is similar to that of an ordinary diode. This implies that current and the light emitting intensity exhibit a considerable nonlinearity accompanied with a rectification with respect to the applied voltage.

It is preferred for the organic EL display that at least one of the electrodes is transparent so as to obtain luminescence at the organic luminant layer. In general, a transparent electrode of a transparent conductive material such as indium tin oxide (ITO) is used for the anode. Use of substances having small work function for the cathode is effective for facilitating the electron injection and thereby raising luminous efficiency, and in general, metal electrodes such as Mg—Ag and Al—Li can be used.

In an organic EL display configured as described above, it is preferable that the organic luminant layer usually is made of a film that is extremely thin such as about 10 nm, so that the organic ruminant layer can transmit substantially whole light as the transparent electrode does. As a result, when the layer does not illuminate, a light beam entering from the surface of the transparent substrate and passing through the transparent electrode and the organic luminant layer before being reflected at the metal layer comes out again to the surface of the transparent substrate. Thereby, the display surface of the organic EL display looks like a mirror when viewed from exterior.

An organic EL display according to the present invention, which includes the organic EL ruminant, has, for example, a transparent electrode on the surface side of the organic luminant layer, and a metal electrode on the backside of the organic luminant layer. In the organic El display, it is preferable that a polarizing plate with optical compensation function according to the present invention is arranged on the surface of the transparent electrode, and furthermore, a λ/4 plate is arranged between the polarizing plate and an EL element. As described above, an organic EL display obtained by arranging a polarizing plate with optical compensation function according to the present invention can suppress external reflection and improve the visibility. It is further preferable that a retardation plate is arranged between the transparent electrode and an optical film.

The retardation plate and the polarizing plate with optical compensation function polarize, for example, light which enters from outside and is reflected by the metal electrode, and thus the polarization has an effect that the mirror of the metal electrode cannot be viewed from exterior. Particularly, the mirror of the metal electrode can be blocked completely by forming the retardation plate with a quarter wavelength plate and adjusting an angle formed by the polarization directions of the retardation plate and the polarizing plate to be π/4. That is, the polarizing plate transmits only the linearly polarized light component among the external light entering the organic EL display. In general, the linearly polarized light is changed into elliptically polarized light by the retardation plate. When the retardation plate is a quarter wavelength plate and when the angle is π/4, the light is changed into circularly polarized light.

This circularly polarized light passes through, for example, the transparent substrate, the transparent electrode, and the organic thin film. After being reflected by the metal electrode, the light passes again through the organic thin film, the transparent electrode and the transparent substrate, and turns into linearly polarized light at the retardation plate. Moreover, since the linearly polarized light crosses the polarization direction of the polarizing plate at a right angle, it cannot pass through the polarizing plate. Consequently, as described above, the mirror of the metal electrode can be blocked completely.

EXAMPLES

The present invention will be described below more specifically by referring to illustrative Examples and Comparative Examples, though the present invention is not restricted to the Examples.

For the polarizing plate, NPF-1224DU (manufactured by Nitto Denko Corporation) having an entire thickness of 190 μm was used.

Example 1

A norbornene film having a thickness of 100 μm was subjected to a tenter transverse stretching at 177° C., thereby obtaining an optically compensating A-layer having a thickness of 80 μm.

On the above-mentioned polarizing plate (trade name: NPF-1224DU, manufactured by Nitto Denko Corporation), a 1 wt % aqueous solution of polyvinyl alcohol was applied and dried at 90° C. for 5 minutes so as to form a coating film having a thickness of 0.01 μm. Next, the coating film was subjected to a rubbing treatment so as to form an alignment layer. 92 weight parts of the nematic liquid crystal monomer represented by the chemical formula (10), 8 weight parts of the polymerizable chiral dopant represented by the chemical formula (38) and having a helical twisting power of 5.5×10$^{-4}$ nm$^{-1}$·(wt %)$^{-1}$, 5 weight parts of a UV polymerization initiator and 300 weight parts of methyl ethyl ketone were mixed to prepare a mixture designed to have a selective reflection wavelength of 290 nm to 310 nm. This mixture was applied onto the alignment layer so as to form a expanded layer.

The polarizing plate having the expanded layer was heat-treated at 90° C. for 1 minute, and further UV-crosslinked. Thereby, an optically compensating B-layer having a thickness of 2.5 μm was formed on a surface of the polarizing plate, and a laminate having an entire thickness of 193 μm was bonded so that the longer side of the layers would overlap each other.

Figure 13:
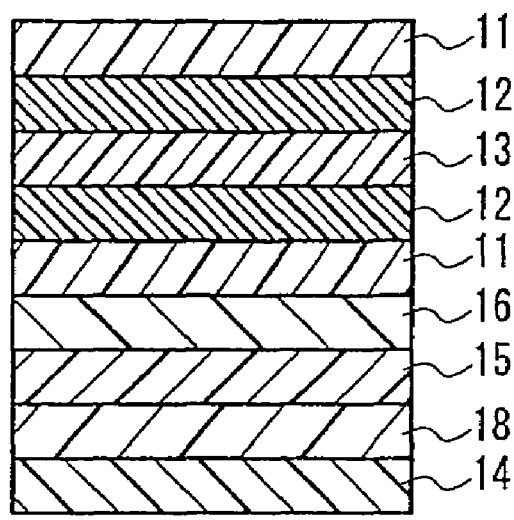
FIG. 13 is a schematic cross-sectional view showing a polarizing plate with optical compensation function according to Example 1 of the present invention.

The thus obtained laminate and the optically compensating A-layer were bonded via an acrylic pressure-sensitive adhesive having a thickness of 25 μm so that the longer side of the layers would overlap each other, thereby obtaining a long polarizing plate (No. 1) with optical compensation function, the polarizing plate had an entire thickness of 298 μm (see FIG. 13). In the thus manufactured polarizing plate with optical compensation function, an absorption axis of the polarizing plate and a slow axis of the optically compensating A-layer formed an angle of 90° C.

Example 2

A triacetylcellulose film having a thickness of 80 μm was subjected to a tenter transverse stretching, thereby obtaining an optically compensating A-layer having a thickness of 50 μm.

92 weight parts of the nematic liquid crystal monomer represented by the chemical formula (10), 8 weight parts of the polymerizable chiral dopant represented by the chemical formula (38) and having a helical twisting power of 5.5×10$^{-4}$ nm$^{-1}$·(wt %)$^{-1}$, 5 weight parts of a UV polymerization initiator and 300 weight parts of methyl ethyl ketone were mixed to prepare the same mixture as in Example 1, which was designed to have a selective reflection wavelength of 290 nm to 310 nm. This mixture was applied onto a biaxially-stretched PET film so as to form a expanded layer.

The biaxially-stretched PET film having the expanded layer was heat-treated at 90° C. for 1 minute, and further UV-crosslinked. Thereby, an optically compensating B-layer having a thickness of 2.0 μm was formed on a surface of the biaxially-stretched PET film.

Next, the optically compensating A-layer and the biaxially-stretched PET film were bonded via an acrylic pressure-sensitive adhesive layer having a thickness of 25 μm so that the optically compensating B-layer faced the optically compensating A-layer. Subsequently, the biaxially-stretched PET

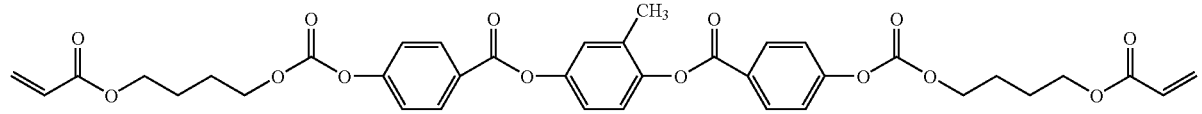

(10)

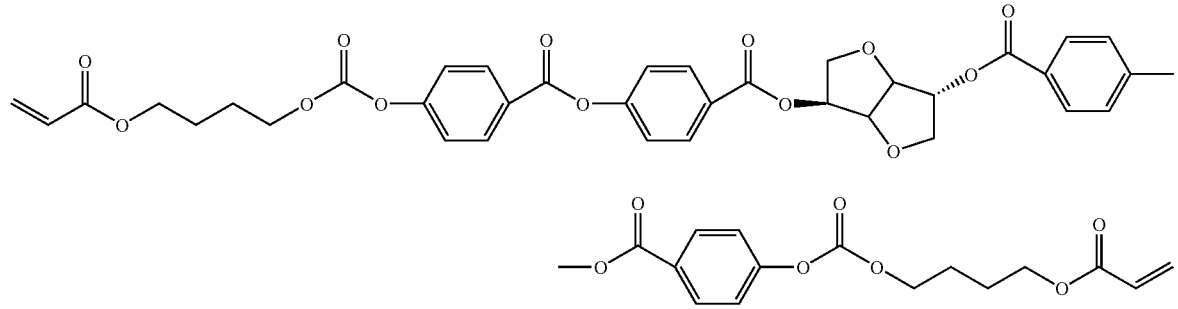

(38)

film was peeled off to provide an optically compensating layer having the optically compensating A-layer and the optically compensating B-layer.

A polyvinyl alcohol film having a thickness of 80 μm was immersed to dye in an aqueous solution containing 0.05 wt % of iodine at 30° C. for 60 seconds, and subsequently, stretched 5 times its original length while being immersed in an aqueous solution containing 4 wt % of boric acid for 60 seconds. After that, the film was dried at 50° C. for 4 minutes to obtain a polarizing layer having a thickness of 20 μm.

Figure 14:
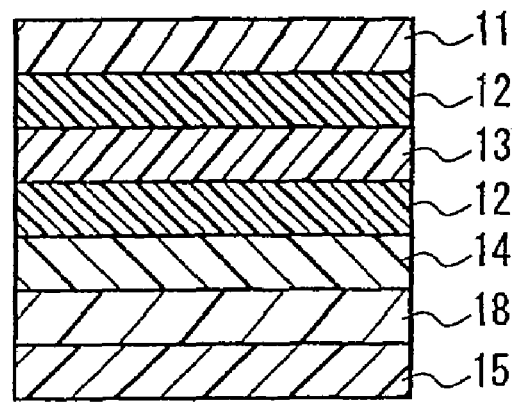
FIG. 14 is a schematic cross-sectional view showing a polarizing plate with optical compensation function according to Example 2 of the present invention.

Finally, a triacetylcellulose having a thickness of 80 μm was bonded to one surface of the polarizing layer, while the optically compensating layer was bonded to the other surface of the polarizing layer via a polyvinyl alcohol-based adhesive having a thickness of 5 μm, so that the optically compensating A-layer faced the polarizing layer, thereby obtaining a long polarizing plate (No. 2) with optical compensation function having an entire thickness of 187 μm (see FIG. 14).

Example 3

Figure 15:
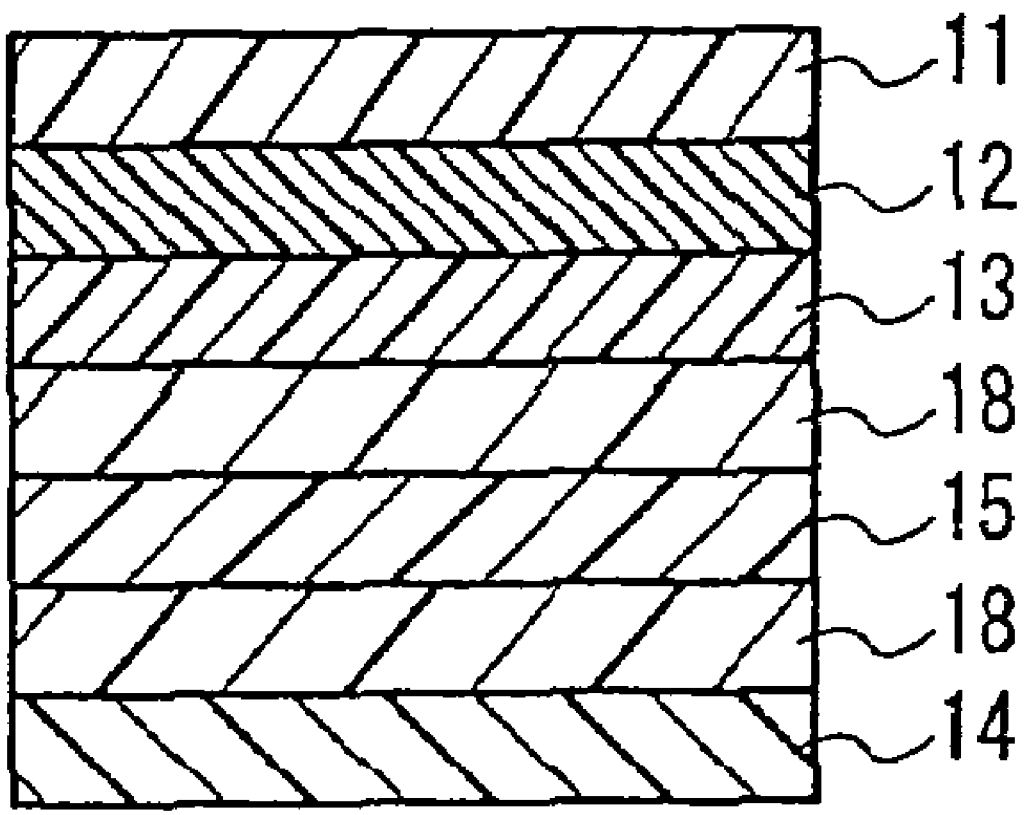
FIG. 15 is a schematic cross-sectional view showing a polarizing plate with optical compensation function according to Example 3 of the present invention.

A long polarizing plate (No. 3) with optical compensation function, having an entire thickness of 207 μm, was obtained in a manner similar to Example 2 except that the polarizing layer and a composite optically compensating layer as in Example 2 were bonded via an acrylic pressure-sensitive adhesive having a thickness of 25 μm so that the optically compensating B-layer faced the polarizing layer (see FIG. 15).

Regarding the optically compensating A-layers and optically compensating B-layers of the polarizing plates with optical compensation function, obtained in Examples 1-3, retardation values (Re) in the normal direction and the retardation values (Rth) in the thickness directions were measured by using a retardation meter applying a parallel Nicol rotation method as a principle (trade name: KOBRA-21ADH, manufactured by Oji Scientific Instruments). The results are shown in Table 1.

Next, for the thus obtained liquid crystal display, viewing angles at contrast ratios of (Co)≧10 in a perpendicular direction, in a lateral direction, in a diagonal direction of 45° to 225°, and in a diagonal direction of 135° to 315°, were measured. The contrast ratios were obtained by, displaying a white image and a black image on the liquid crystal display, for measuring the values of Y, x and y in a XYZ display system at viewing angles of 0-70° at the front, upper, lower, right and left sides of the display, by using an instrument (trade name: Ez contrast 160D, manufactured by ELDIM SA). Based on the Y-value ($Y_W$) for the white image and the Y-value ($Y_B$) for the black image, the contrast ratio ($Y_W/Y_B$) for every viewing angle was calculated. The results are shown in Table 2.

Comparative Example 1

A liquid crystal display was obtained in the same manner as Examples 4-6 except that the polarizing plate having optically compensation function, as in any of Examples 1-3, was replaced by the polarizing plate (trade name: NPF-1224DU, manufactured by Nitto Denko Corporation). For the thus obtained liquid crystal display, the viewing angles were measured as in Examples 4-6. The results are shown in Table 2.

Comparative Example 2

Similarly to Example 1, a norbornene film having a thickness of 100 μm was subjected to a tenter transverse stretching at 177° C., thereby obtaining an optically compensating A-layer having a thickness of 80 μm. The optically compensating A-layer and the polarizing plate (trade name: NPF-1224DU, manufactured by Nitto Denko Corporation) were bonded via an acrylic pressure-sensitive adhesive having a thickness of 25 μm. A liquid crystal display was obtained in the same manner as Examples 4-6 except that the thus obtained polarizing plate with the optically compensating A-layer was used for any of the polarizing plates having

TABLE 1

| | Optically compensating A-layer | | | | Optically compensating B-layer | | |
| --- | --- | --- | --- | --- | --- | --- | --- |
| | Re (nm) | Rth (nm) | Rth/Re | Thickness (μm) | Re (nm) | Rth (nm) | Thickness (μm) |
| Example 1 | 50 | 108 | 2.16 | 80 | 0 | 185 | 2.5 |
| Example 2 | 50 | 68 | 1.36 | 50 | 1 | 142 | 2 |
| Example 3 | 50 | 68 | 1.36 | 50 | 1 | 142 | 2 |

Table 1 shows that the optically compensating B-layers are considerably thinner than the optically compensating A-layers. Therefore, the thus provided polarizing plate with optical compensation function, including an optically compensating A-layer and an optically compensating Players was thinner than a laminated polarizing plate including two or more optically compensating A-layers as stretched polymer films.

Examples 4-6

Each of the polarizing plates (Nos. 1-3) with optical compensation function, obtained in Examples 1-3, was cut out to obtain a piece of 5 cm×5 cm. This piece was combined with each of the polarizing plates, and arranged on both surfaces of a VA type liquid crystal cell so that the retardation axes cross at right angles, thereby obtaining a liquid crystal display. Here, the optically compensating layer was located to face the cell side.

optical compensation function, obtained in Examples 1-3. For the thus obtained liquid crystal display, the viewing angles were measured as in Examples 4-6. The results are shown in Table 2.

Comparative Example 3

Similarly to Example 1, a 1 wt % aqueous solution of polyvinyl alcohol was applied onto the polarizing plate (trade name: NPF-1224DU, manufactured by Nitto Denko Corporation), dried at 90° C. for 5 minutes, so that a coating film having a thickness of 0.01 μm was formed. Next, the coating film was subjected to a rubbing treatment so as to form an alignment layer. 92 weight parts of the nematic liquid crystal monomer represented by the chemical formula (10), 8 weight parts of the polymerizable chiral dopant represented by the chemical formula (38) and having a helical twisting power of $5.5 \times 10^{-4}$ $nm^{-1}\cdot(wt\%)^{-1}$, 5 weight parts of a UV polymerization initiator and 300 weight parts of methyl ethyl ketone were mixed to prepare a mixture. This mixture was applied onto the alignment layer so as to form an expended layer.

The polarizing plate having the expanded layer was heat-treated at 90° C. for 1 minute, and further UV-crosslinked. Thereby, an optically compensating B-layer having a thickness of 2.5 μm was formed on a surface of the polarizing plate, and a laminate having an entire thickness of 193 μm was bonded thereon so that the longer side of the layers would overlap each other.

A liquid crystal display was obtained in the same manner as Examples 4-6 except that the thus obtained polarizing plate with the optically compensating B-layer was used for any of the polarizing plates with optical compensation function obtained in Examples 1-3. For the thus obtained liquid crystal display, the viewing angles were measured as in Examples 4-6. The results are shown in Table 2.

TABLE 2

| | Film type | | Viewing angle (°) | | | |
| --- | --- | --- | --- | --- | --- | --- |
| | Front | Rear | Perpendicular | Lateral | Diagonal (45-225°) | Diagonal (135-315°) |
| Example 4 | Polarizing plate | No. 1 | ±80 | ±80 | ±60 | ±60 |
| Example 5 | Polarizing plate | No. 2 | ±80 | ±80 | ±65 | ±65 |
| Example 6 | Polarizing plate | No. 3 | ±80 | ±80 | ±65 | ±65 |
| Com. Ex*. 1 | Polarizing plate | Polarizing plate | ±80 | ±80 | ±35 | ±35 |
| Com. Ex. 2 | Polarizing plate | Polarizing plate + A-layer | ±80 | ±80 | ±40 | ±40 |
| Com. Ex. 3 | Polarizing plate | Polarizing plate + B-layer | ±80 | ±80 | ±50 | ±50 |

*Comparative Example

As clarified from the results of Table 2, each of the liquid crystal displays obtained in Examples 4-6 had a wide viewing angle. This shows that the polarizing plate with optical compensation function according to the present invention has an excellent optical compensation function.

Industrial Applicability

Therefore, it is shown that a polarizing plate with optical compensation function according to the present invention is provided by laminating an optically compensating layer that is thinner than an optically compensating layer as a laminate of two or more stretched polymer films. By using the polarizing plate, a liquid crystal display of excellent visibility and providing a high quality display can be provided.

The invention claimed is:

1. A liquid crystal display comprising:
   a polarizing plate having a polarizing layer, an optically compensating A-layer and an optically compensating B-layer; and
   a VA-type liquid cell adjacent to the polarizing plate,
   wherein the VA-type liquid crystal cell is compensated only by the optically compensating A-layer and the optically compensating B-layer,
   wherein the optically compensating A-layer comprises a polymer film,
   wherein the optically compensating B-layer comprises a cholesteric liquid crystal layer,
   wherein the optically compensating A-layer is on a side of the optically compensating B-layer opposed to the polarizing layer,
   wherein the optically compensating A-layer meets requirements indicated by the following formulae (I) and (II):

$$20 \text{ (nm)} \leq Re \leq 300 \text{ (nm)} \quad (I)$$

$$1.2 \leq Rth/Re \quad (II)$$

wherein, in the formulae,
   Re (retardation value in normal direction)=(nx−ny)·d
   Rth (retardation value in thickness direction)=(nx−nz)·d;
   where nx, ny and nz respectively denote refractive indices of X axis, Y axis and Z axis in the optically compensating A-layer; the X axis denotes an axial direction presenting a maximum refractive index within the optically compensating A-layer, the Y axis denotes an axial direction perpendicular to the X axis within the optically compensating A-layer, and the Z axis denotes a thickness direction perpendicular to the X axis and the Y axis; 'd' denotes the thickness of the optically compensating A-layer, and
   wherein Re (retardation value in normal direction) of the optically compensating B-layer is about 0.

2. The liquid crystal display according to claim 1, wherein the polarizing plate further comprises at least one of an alignment layer and a base.

3. The liquid crystal display according to claim 1, wherein the polymer film is either a stretched film or a liquid crystal film.

4. The liquid crystal display according to claim 1, further comprising a pressure-sensitive adhesive layer, the pressure-sensitive adhesive layer being arranged on one of the surfaces of the polarizing plate.

5. The liquid crystal display according to claim 1, wherein the polarizing layer and the optically compensating A-layer are arranged so that an angle formed by an absorption axis of the polarizing layer and a slow axis of the optically compensating A-layer is not smaller than 85° and not larger than 95°.

6. The liquid crystal display according to claim 1, wherein a selective reflection wavelength range of the cholesteric liquid crystal layer is in a range not larger than 350 nm.

* * * * *